US012529661B2

(12) United States Patent
Inoue

(10) Patent No.: US 12,529,661 B2
(45) Date of Patent: Jan. 20, 2026

(54) INSPECTION APPARATUS

(71) Applicant: NEC Corporation, Tokyo (JP)

(72) Inventor: Keiko Inoue, Tokyo (JP)

(73) Assignee: NEC Corporation, Tokyo (JP)

( * ) Notice: Subject to any disclaimer, the term of this patent is extended or adjusted under 35 U.S.C. 154(b) by 296 days.

(21) Appl. No.: 18/025,041

(22) PCT Filed: Sep. 18, 2020

(86) PCT No.: PCT/JP2020/035523
§ 371 (c)(1),
(2) Date: Mar. 7, 2023

(87) PCT Pub. No.: WO2022/059185
PCT Pub. Date: Mar. 24, 2022

(65) Prior Publication Data
US 2023/0314338 A1    Oct. 5, 2023

(51) Int. Cl.
G01N 21/90 (2006.01)
G01N 35/00 (2006.01)
H04N 23/695 (2023.01)

(52) U.S. Cl.
CPC ......... *G01N 21/90* (2013.01); *G01N 35/0099* (2013.01); *H04N 23/695* (2023.01)

(58) Field of Classification Search
CPC .............. G01N 21/90; G01N 35/0099; G01N 21/9009; G01N 21/9027; H04N 23/695
USPC ........................................................ 356/246
See application file for complete search history.

(56) References Cited

U.S. PATENT DOCUMENTS

| 5,864,395 A | 1/1999 | Laurberg |
| 2009/0279082 A1 | 11/2009 | Till et al. |
| 2019/0094888 A1* | 3/2019 | Hiroi ............... G05D 1/106 |
| 2022/0146437 A1* | 5/2022 | Yachida ............. G01N 21/9081 |

FOREIGN PATENT DOCUMENTS

| JP | 2000329704 A | * 11/2000 | ......... G01N 21/9027 |
| JP | 2005-098832 A | 4/2005 | |
| JP | 2008-224562 A | 9/2008 | |
| JP | 2010-261844 A | 11/2010 | |
| JP | 2013-096921 A | 5/2013 | |
| JP | 2013-096922 A | 5/2013 | |
| JP | 2018-205199 A | 12/2018 | |
| JP | 2020-118458 A | 8/2020 | |

(Continued)

OTHER PUBLICATIONS

Extended European Search Report for EP Application No. 20954170.5, dated on Oct. 10, 2023.

(Continued)

*Primary Examiner* — Md M Rahman
(74) *Attorney, Agent, or Firm* — Sughrue Mion, PLLC

(57) ABSTRACT

An inspection apparatus includes a grasping unit configured to grasp a container in which a liquid is charged, an inclination unit configured to at least incline the container around a first axis with the grasping unit grasping the container, and a change unit configured to change an area of the container imaged by an imaging apparatus by changing relative orientations of the container and the imaging apparatus around a second axis different from the first axis.

6 Claims, 20 Drawing Sheets

(56) References Cited

FOREIGN PATENT DOCUMENTS

WO       2005/031328 A1     4/2005
WO     WO-2010128384 A1 * 11/2010  ............ B01F 9/0005

OTHER PUBLICATIONS

International Search Report for PCT Application No. PCT/JP2020/035523, mailed on Nov. 17, 2020.
Written opinion for PCT Application No. PCT/JP2020/035523, mailed on Nov. 17, 2020.

* cited by examiner

DETERMINATION SYSTEM 100

INSPECTION APPARATUS

This application is a National Stage Entry of PCT/JP2020/035523 filed on Sep. 18, 2020, the contents of all of which are incorporated herein by reference, in their entirety.

TECHNICAL FIELD

The present invention relates to an inspection apparatus, inspection method, storage medium, inspection system, and information processing apparatus.

BACKGROUND ART

Technologies for detecting foreign matters in a liquid charged in a container are known.

One example of a technology used to detect foreign matters is Patent Literature 1. Patent Literature 1 describes an inspection apparatus including rotation means, control means, and inspection means. According to Patent Literature 1, the control means measures the orientation of a container serving as a subject and controls the rotation means so that the orientation of the container becomes a predetermined orientation for inspection in a predetermined inspection position at an inspection time point. The inspection means inspects the container when the container reaches the predetermined inspection position. Patent Literature 1 discloses that the orientation of the container is controlled because while the orientation of the container does not affect the inspection accuracy in cases such as a case where no label is affixed to the container, it affects the inspection accuracy when a label is affixed to the container.

One example of related art is Patent Literature 2. Patent Literature 2 describes an inspection apparatus that detects foreign matters on the basis of a first transmission image acquired with a container serving as an inspection bottle inclined and a second transmission image acquired after the container is rotated and then the rotation is stopped.

CITATION LIST

Patent Literature

[Patent Literature 1] Japanese Unexamined Patent Application Publication No. 2005-98832
[Patent Literature 2] Japanese Unexamined Patent Application Publication No. 2013-96921

SUMMARY OF INVENTION

Problem Solved by Invention

Patent Literature 1 discloses that the orientation of the container does not affect the inspection accuracy when no label is affixed to the container. However, depending on the shape of the container, an image near the center of the container is enlarged in the lateral direction due to cylindrical lens effects, while an image near an edge of the container is reduced in the lateral direction or a virtual image occurs near the edge of the container. This may result in a failure to detect foreign matters present near the edge of the container.

As seen above, Patent Literature 1 has a problem that it may fail to accurately detect foreign matters present in the container. Such a problem is difficult to solve even if a technology as described in Patent Literature 2 is used.

In view of the foregoing, an object of the present invention is to provide an inspection apparatus, inspection method, storage medium, inspection system, and information processing apparatus capable of accurately detecting foreign matters present in a container.

Solution to Problem

An inspection apparatus according to one aspect of the present disclosure includes a grasping unit configured to grasp a container in which a liquid is charged, an inclination unit configured to at least incline the container around a first axis with the grasping unit grasping the container, and a change unit configured to change an area of the container imaged by an imaging apparatus by changing relative orientations of the container and the imaging apparatus around a second axis different from the first axis.

An inspection method according to another aspect of the present disclosure includes an information processing apparatus changing an area of a container imaged by an imaging apparatus by changing relative orientations of the container and the imaging apparatus around a second axis different from a first axis, then at least inclining the container around the first axis, and then again changing the relative orientations of the container and the imaging apparatus around the second axis.

A storage medium according to another aspect of the present disclosure is a computer-readable storage medium storing a program for causing an information processing apparatus to perform a process of changing an area of a container imaged by an imaging apparatus by changing relative orientations of the container and the imaging apparatus around a second axis different from a first axis, then at least inclining the container around the first axis, and then again changing the relative orientations of the container and the imaging apparatus around the second axis.

An inspection system according to another aspect of the present disclosure includes an inspection apparatus, an imaging apparatus disposed outside the inspection apparatus and configured to image a liquid charged in a container, and a determination apparatus configured to detect objects on the basis of image data captured by the imaging apparatus and to determine whether the detected objects are foreign matters. The inspection apparatus includes a grasping unit configured to grasp the container in which the liquid is charged, an inclination unit configured to at least incline the container around a first axis with the grasping unit grasping the container, and a change unit configured to change an area of the container imaged by the imaging apparatus by changing relative orientations of the container and the imaging apparatus around a second axis different from the first axis.

An information processing apparatus according to another aspect of the present disclosure includes a background model generation unit configured to generate a first background model on the basis of acquired image data and to generate a second background model on the basis of image data acquired after an imaged area of a container is changed and a detection unit configured to detect precipitates in the container on the basis of the first background model and to detect precipitates in the container on the basis of the second background model.

An inspection method according to another aspect of the present disclosure includes generating, by an information processing apparatus, a first background model on the basis of acquired image data and generating a second background model on the basis of image data acquired after an imaged area of a container is changed by changing relative orientations of the container and an imaging apparatus and detecting, by the information processing apparatus, precipitates in the container on the basis of the first background model and detecting precipitates in the container on the basis of the second background model.

A storage medium according to another aspect of the present disclosure is a computer-readable storage medium storing a program for causing an information processing apparatus to generate a first background model on the basis of acquired image data and generate a second background model on the basis of image data acquired after an imaged area of a container is changed by changing relative orientations of the container and an imaging apparatus and detect precipitates in the container on the basis of the first background model and detect precipitates in the container on the basis of the second background model.

Advantageous Effects of the Invention

According to the above configurations, foreign matters present in the container can be detected accurately.

DESCRIPTION OF EMBODIMENTS

First Embodiment

Figure 1:
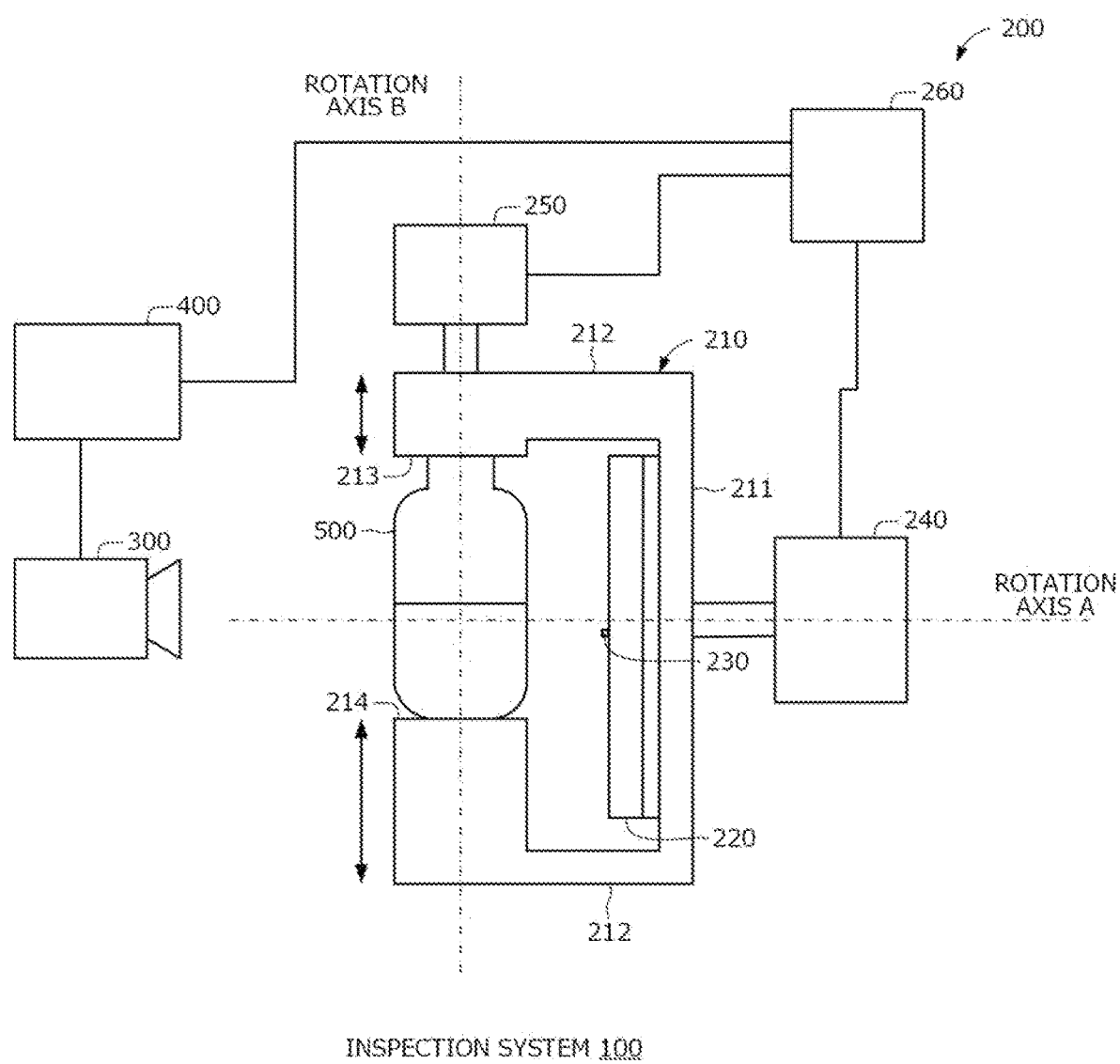
FIG. 1 is a diagram showing an example of the overall configuration of an inspection system according to a first embodiment of the present disclosure.
Figure 2:
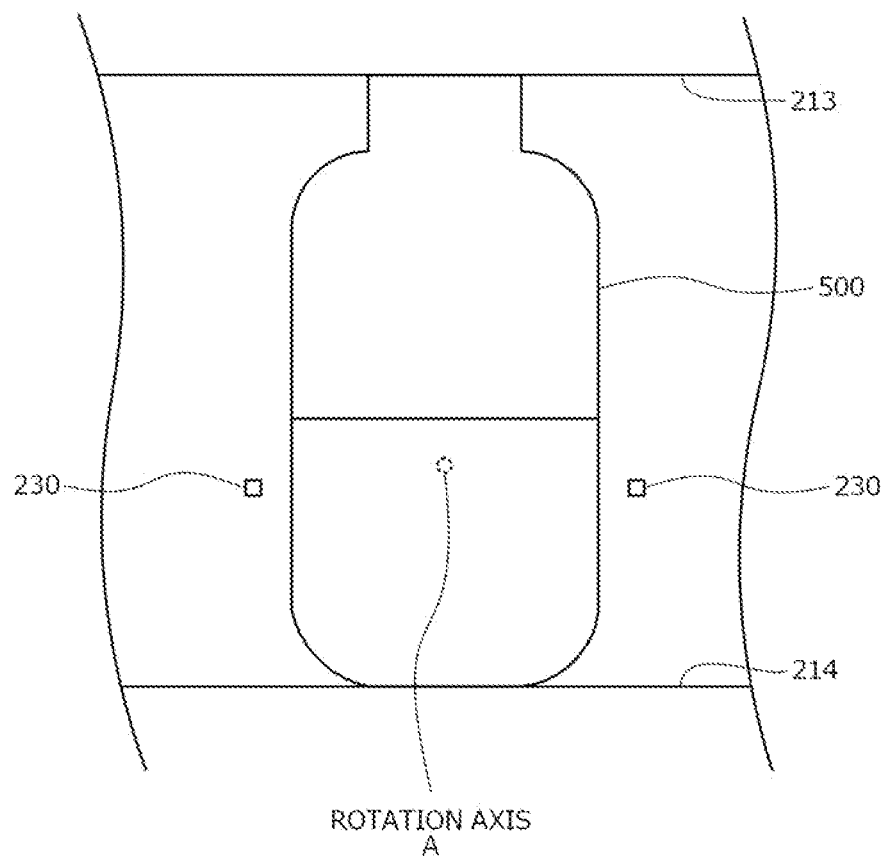
FIG. 2 is a diagram showing an example of the position relationship between a container and markers.
Figure 3:
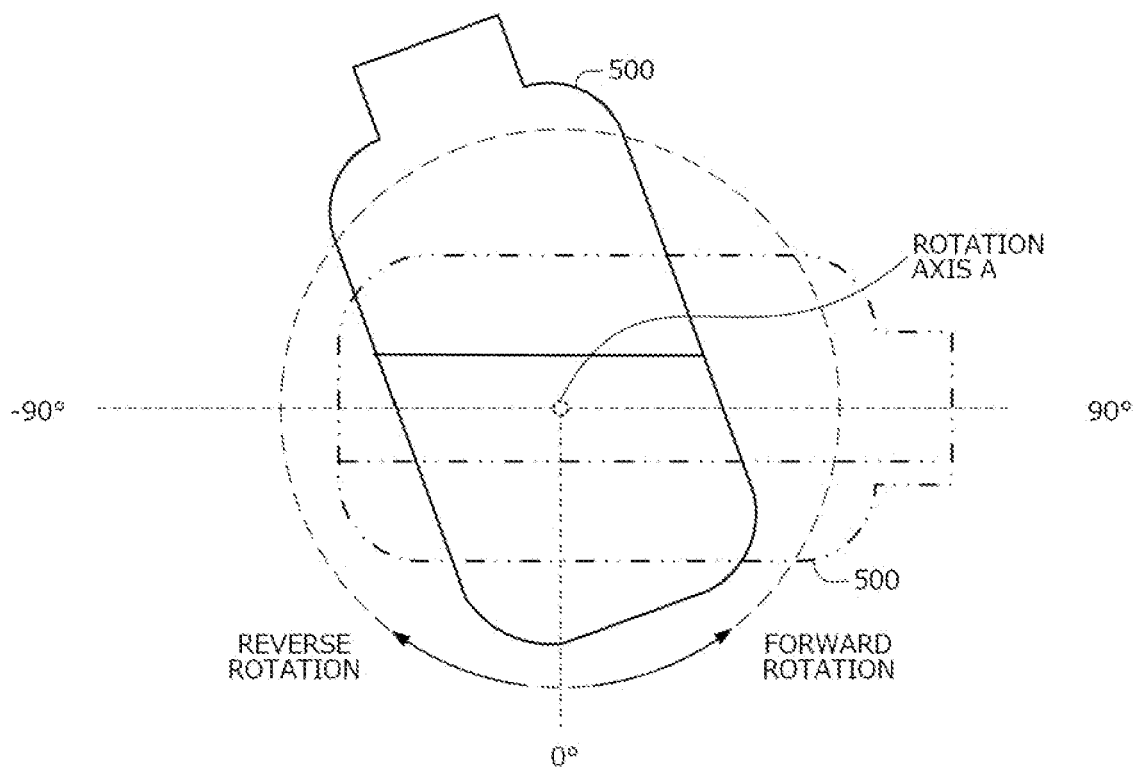
FIG. 3 is a diagram showing an example of the movement of the container around a rotation axis A.
Figure 4:
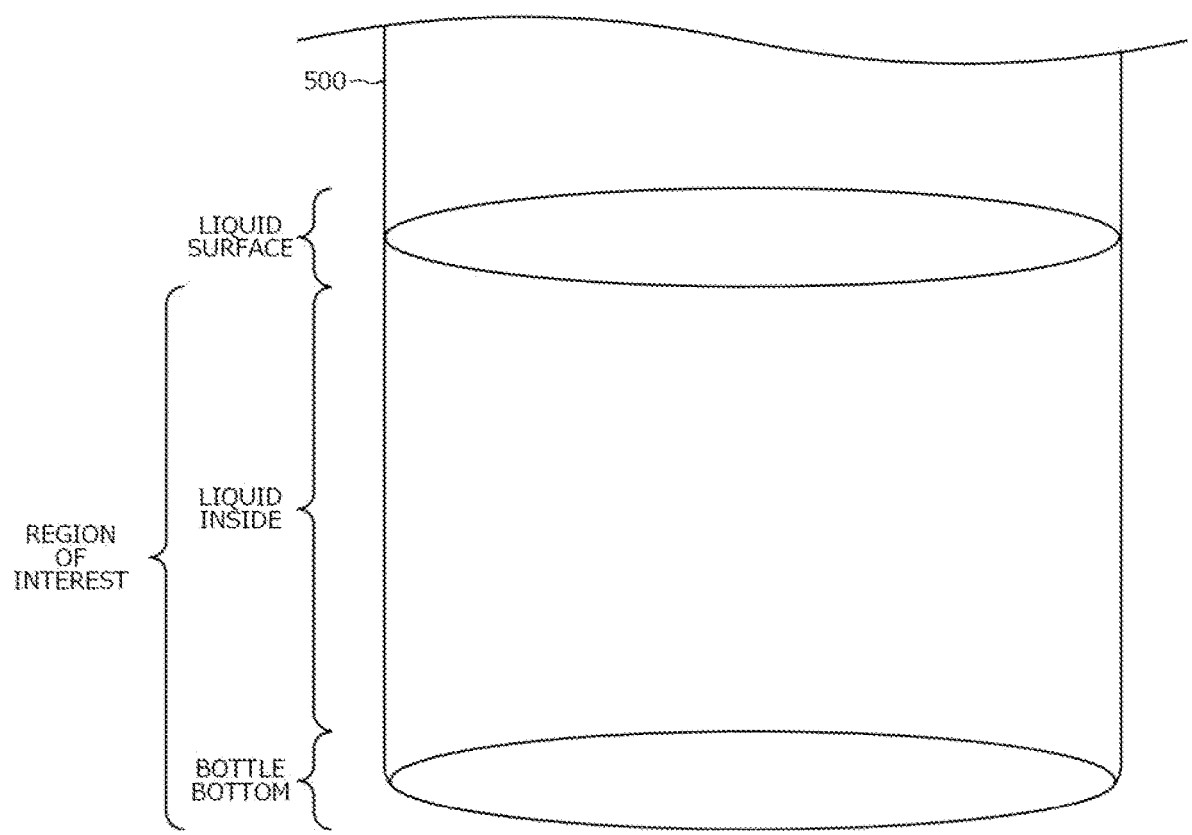
FIG. 4 is a diagram showing a region of interest.
Figure 5:
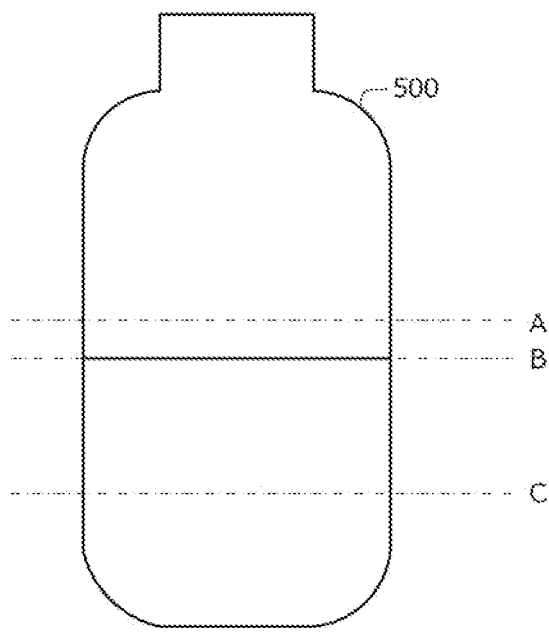
FIG. 5 is a diagram showing the position of the rotation axis A.
Figure 6:
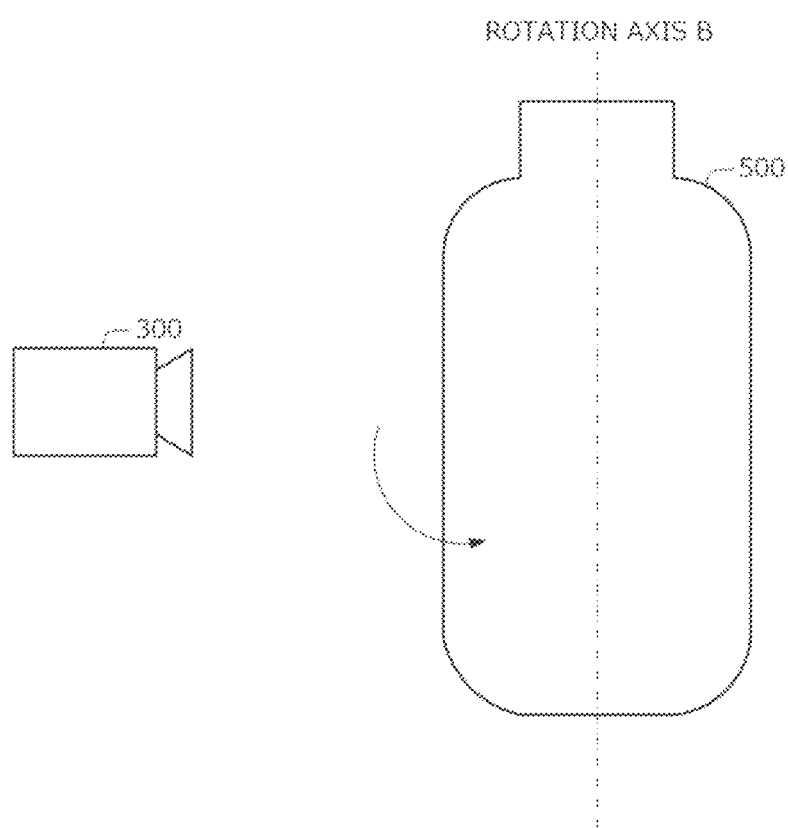
FIG. 6 is a diagram showing an example of the movement of the container around a rotation axis B.
Figure 7:
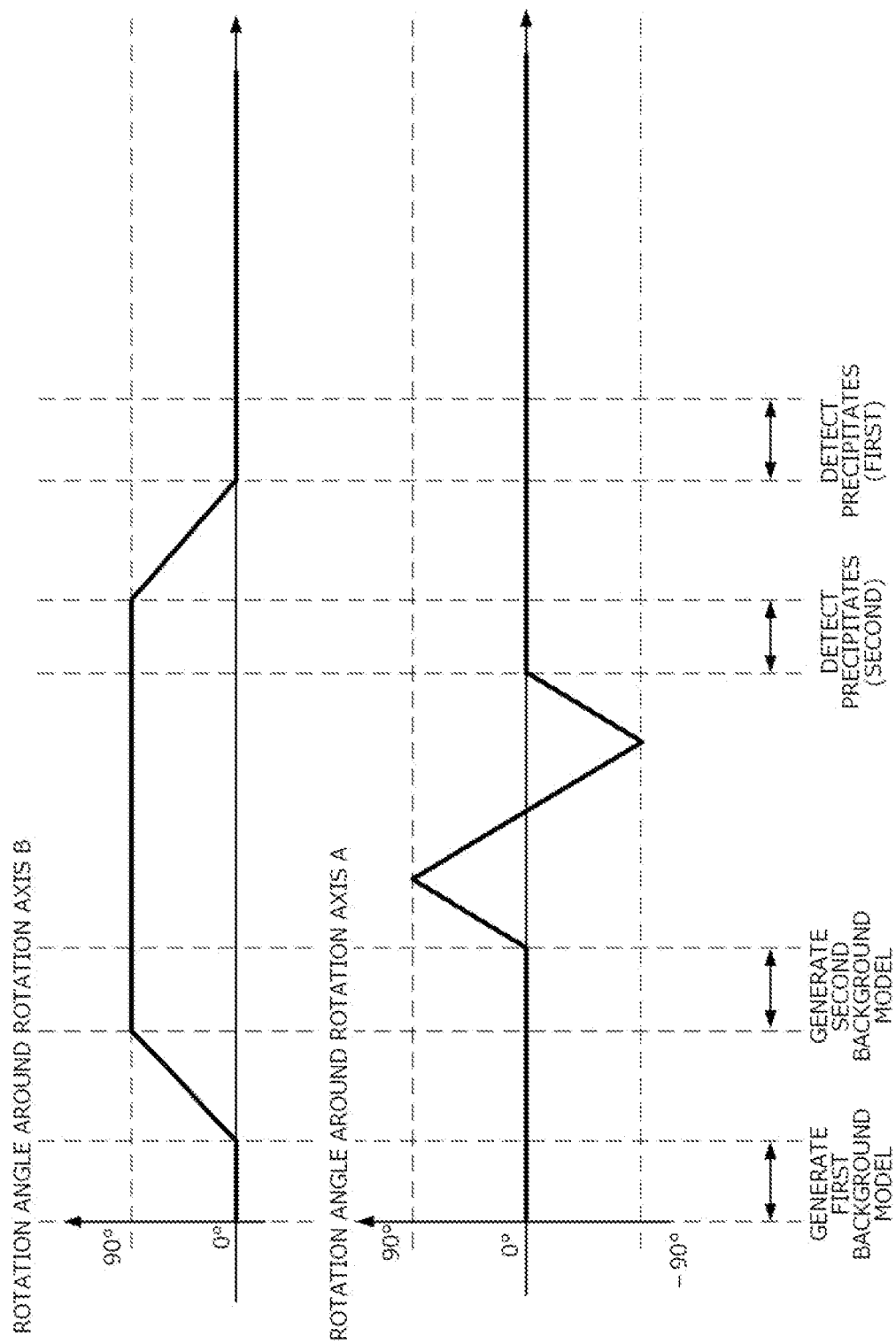
FIG. 7 is a diagram showing an example of the time line of the rotation angle.
Figure 8:
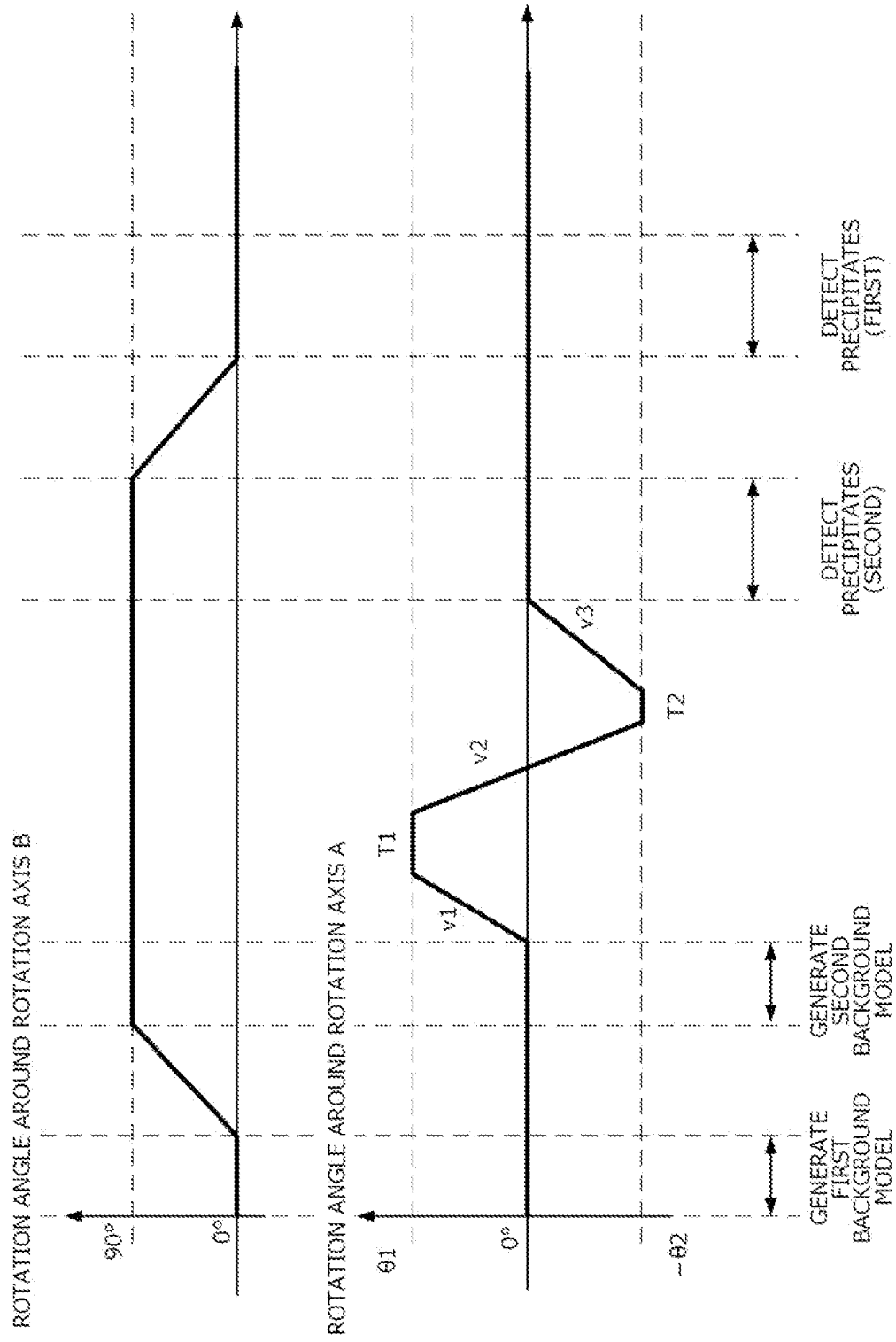
FIG. 8 is a diagram showing another example of the time line of the rotation angle.
Figure 9:
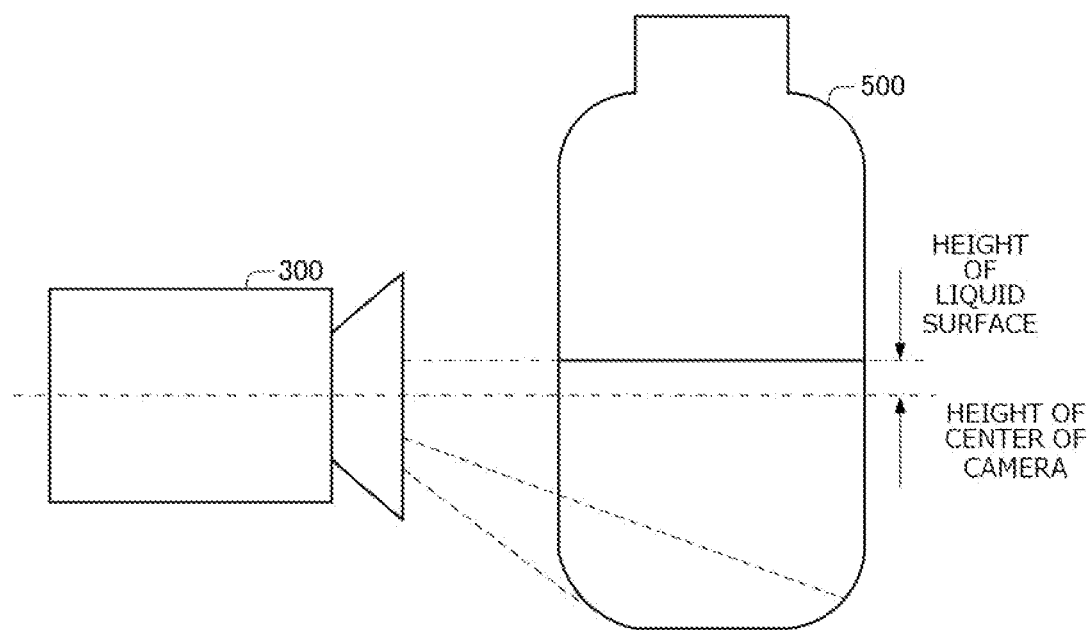
FIG. 9 is a diagram showing the position of a camera.
Figure 10:
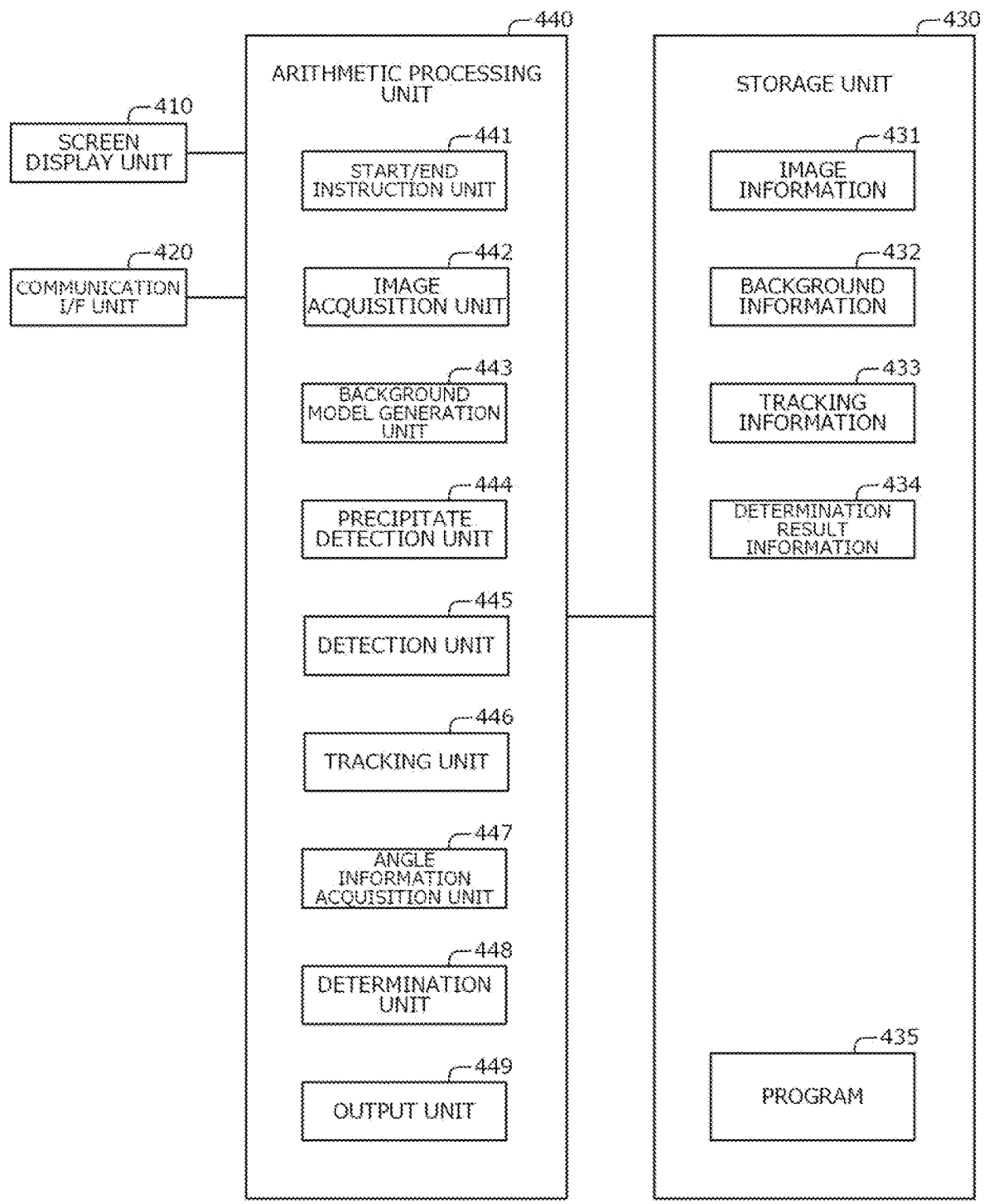
FIG. 10 is a block diagram showing an example of the configuration of a detection/determination apparatus.
Figure 11:
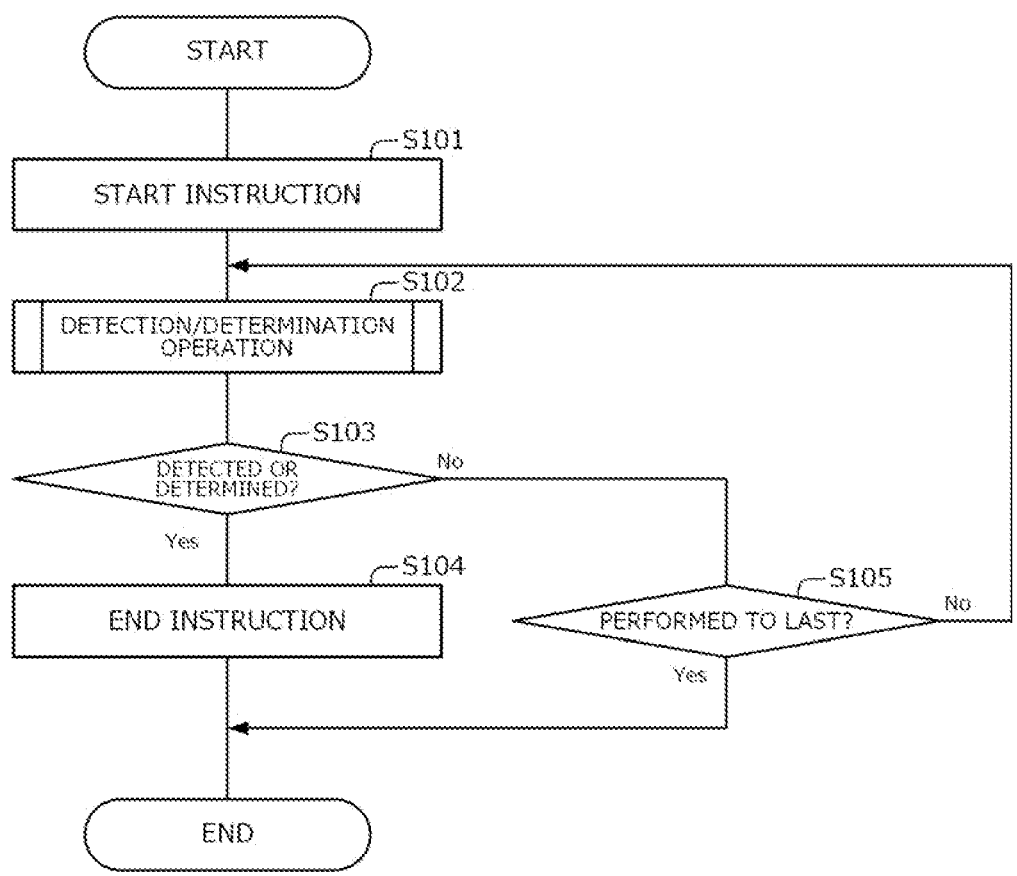
FIG. 11 is a flowchart showing an example of the overall operation of the inspection system.
Figure 12:
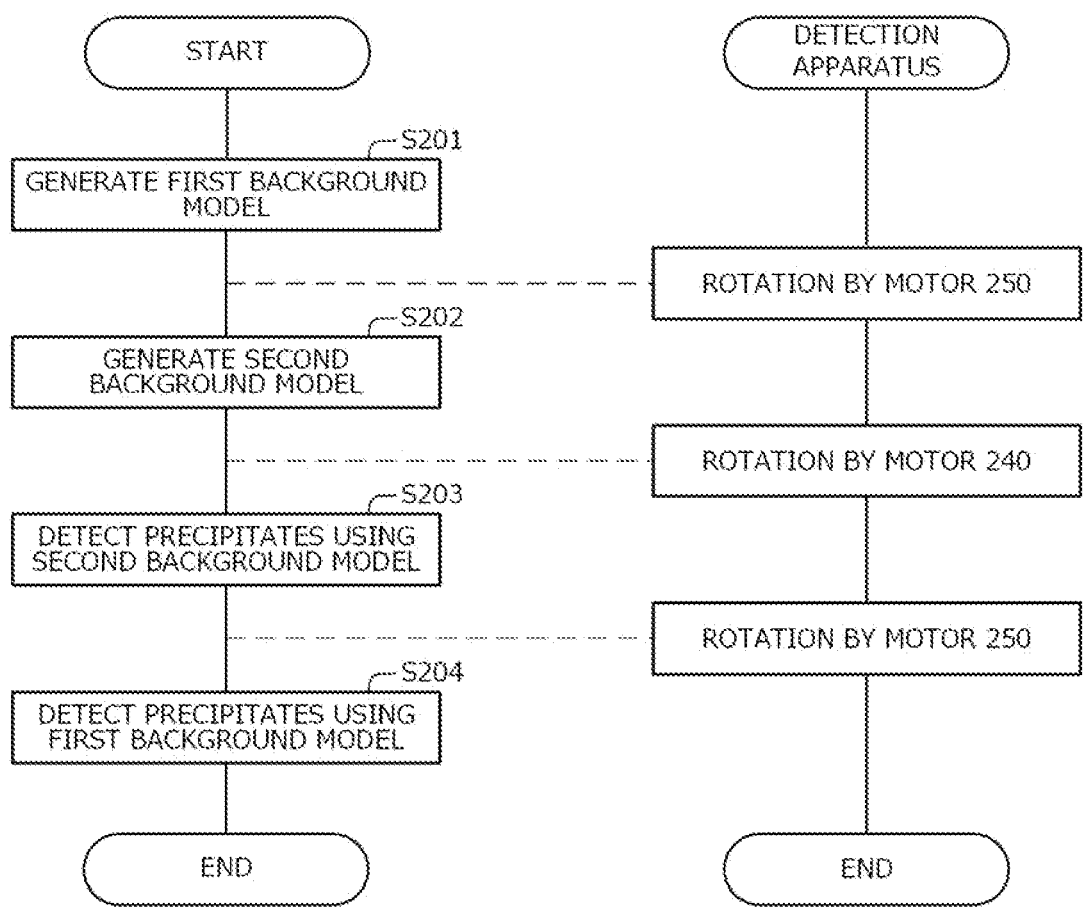
FIG. 12 is a flowchart showing example operations in a detection process using background models.
Figure 13:
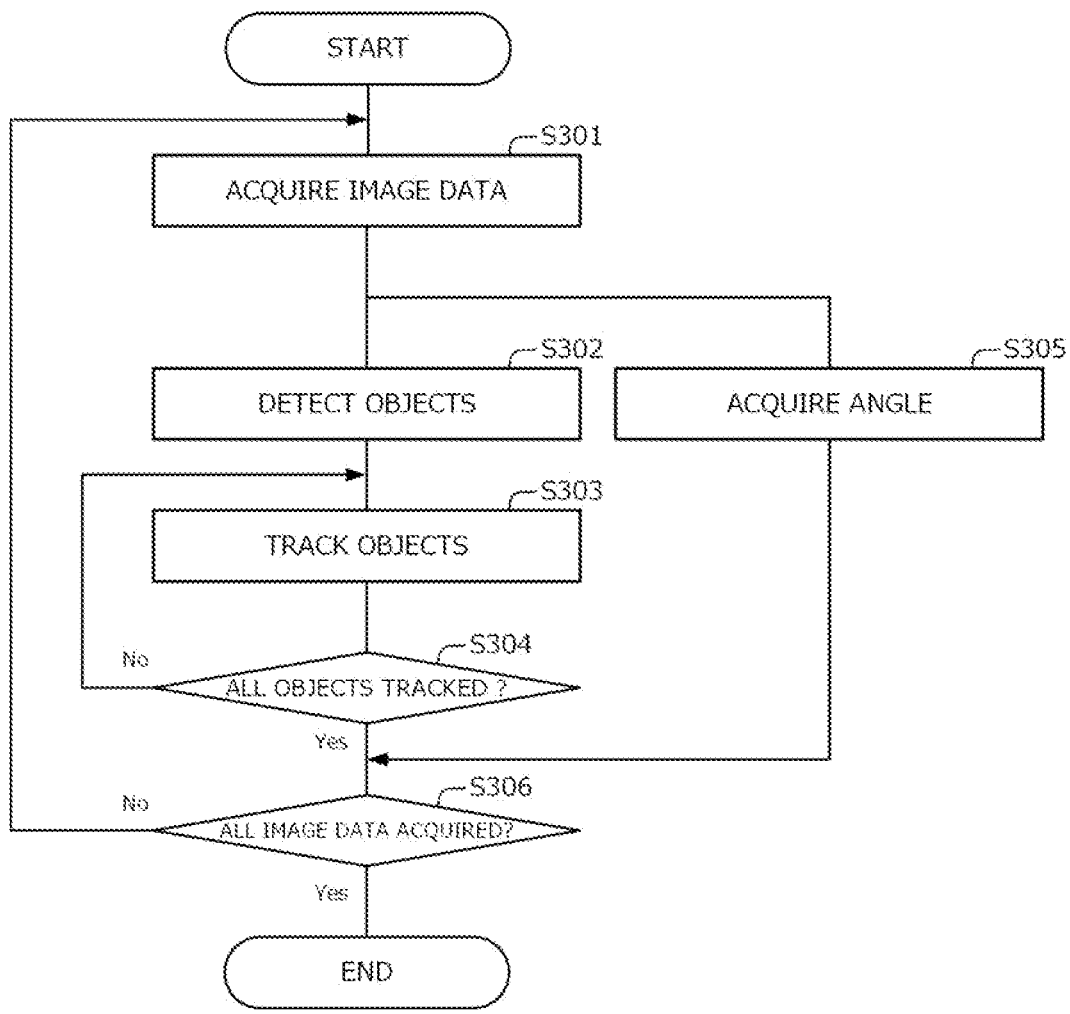
FIG. 13 is a flowchart showing example operations in a detection process without using background models.
Figure 14:
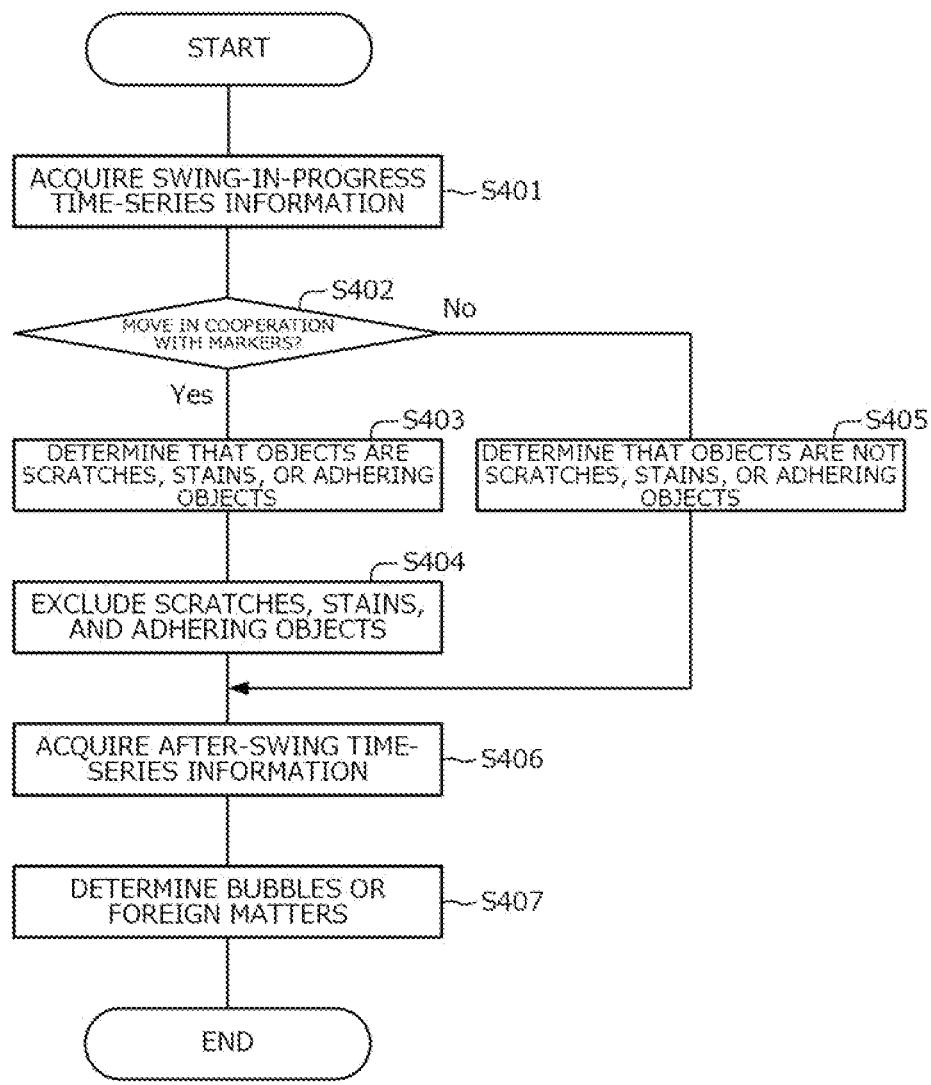
FIG. 14 is a flowchart showing example determination operations in a detection process without using background models.

A first embodiment of the present disclosure will be described with reference to FIGS. 1 to 14. FIG. 1 is a diagram showing an example of the overall configuration of an inspection system 100. FIG. 2 is a diagram showing an example of the positional relationship between a container 500 and markers 230. FIG. 3 is a diagram showing an example of the movement of the container 500 around a rotation axis A. FIG. 4 is a diagram showing a region of interest. FIG. 5 is a diagram showing the position of the rotation axis A. FIG. 6 is a diagram showing an example of the movement of the container 500 around a rotation axis B. FIGS. 7 and 8 are diagrams showing examples of the time line of the rotation angle. FIG. 9 is a diagram showing the position of a camera 300. FIG. 10 is a block diagram showing an example of the configuration of a detection/determination apparatus 400. FIG. 11 is a flowchart showing an example of the overall operation of the inspection system 100. FIG. 12 is a flowchart showing example operations of the detection/determination apparatus 400 in a detection process using background models. FIGS. 13 and 14 are flowcharts showing example operations of the detection/determination apparatus 400 when detecting foreign matters without using background models.

In the first embodiment of the present disclosure, the inspection system 100 that detects objects present in the container 500 in which a liquid such as water or drug is charged and determines foreign matters such as hairs or glass pieces among the detected objects will be described. As will be described later, the inspection system 100 includes two rotation means. By controlling the two rotation means, the inspection system 100 changes the relative orientations of the container 500 and camera 300 to change the imaged area of the container 500 or inclines and swings the grasped container 500.

In the present embodiment, the liquid-charging side of the container 500 shown in FIG. 1 is defined as an upper side, and the side opposite thereto is defined as a lower side. In FIG. 1, the liquid charged into the container 500 is accumulated on the lower side of the container 500.

In the present embodiment, a case in which an inspection apparatus 200 includes the markers 230 (to be discussed later) will be described. However, the present invention can also be applied to cases other than the case in which the inspection apparatus 200 includes the markers 230. In other words, the inspection apparatus 200 need not include the markers 230.

FIG. 1 is a side view showing an example of the overall configuration of the inspection system 100. Referring to FIG. 1, the inspection system 100 includes, for example, the inspection apparatus 200 including a motor 240 and a motor 250 as rotation means, the camera 300, and the detection/determination apparatus 400. As shown in FIG. 1, the camera 300 and detection/determination apparatus 400 are communicatively connected to each other by wire or wirelessly. The detection/determination apparatus 400 or camera 300 and a rotation controller 260 included in the inspection apparatus 200 are communicatively connected to each other by wire or wirelessly.

The inspection apparatus 200 is an apparatus that inclines and swings or rotates the container 500 while sandwiching and grasping the liquid-filled container 500 from the up-down direction. The inspection apparatus 200 according to the present embodiment swings the container 500 around the rotation axis A, which is an axis in parallel with the camera line-of-sight direction, as well as rotates the container 500 around the rotation axis B, which is an axis passing through the center of the container 500 vertically. That is, the inspection apparatus 200 includes two rotation means. As will be described later, the inspection apparatus 200 changes the relative orientations of the container 500 and camera 300 by rotating the container 500 around the rotation axis B and thus changes the imaged area of the container 500. As a result, for example, an edge portion of the container 500 seen from the camera 300 before the rotation comes near the center of the container 500 seen from the camera 300 after the rotation. Also, the inspection apparatus 200 makes foreign matters or the like rise in the container 500 by inclining and swinging the container 500 around the rotation axis A.

FIG. 1 shows an example of the configuration of the inspection apparatus 200. Referring to FIG. 1, the inspection apparatus 200 includes, for example, a body 210 including a grasping unit consisting of an upper grasping portion 213 and a lower grasping portion 214, surface lighting 220, the markers 230, the motor 240, the motor 250, and the rotation controller 260.

The body 210 makes an inclination, swing, or the like in accordance with the rotation of the motor 240 serving as rotation means. For example, the body 210 is rectangular in a front view. In the present embodiment, the material of the body 210 is not limited to a particular material. The body 210 may be made of any material such as a resin or metal. Also, the body 210 may have a shape other than that described above.

FIG. 1 shows an example of a side view of the body 210. Referring to FIG. 1, the body 210 includes, for example, a flat portion 211 coupled to the motor 240, arms 212 that extend toward the side opposite to the motor 240-located side from the upper and lower ends of the flat portion 211, and the grasping unit that is formed on the ends on the side opposite to the motor 240-located side of the arms 212 and sandwiches and grasps the container 500.

The grasping unit includes the upper grasping portion 213 that protrudes downward from the upper arm 212 and contacts the upper side (the liquid charging side) of the container 500 and the lower grasping portion 214 that protrudes upward from the lower arm 212 and contacts the lower side of the container 500. As shown in FIG. 1, the upper grasping portion 213 contacts the container 500 from the upper side of the container 500, and the lower grasping portion 214 contacts the container 500 from the lower side of the container 500. Thus, the grasping unit sandwiches and grasps the container 500 from the up-down direction.

The grasping unit also grasps the container 500 such that the container 500 can rotate around the rotation axis B in accordance with the rotation of the motor 250. For example, the upper grasping portion 213 includes a rotating portion that rotates around the rotation axis B in accordance with the rotation of the motor 250, and the lower grasping portion 214 includes a rotating portion that rotates around the rotation axis B in accordance with the rotation of the container 500. According to the above configuration, the grasping unit grasps the container 500 such that the container 500 can rotate around the rotation axis B in accordance with the rotation of the motor 250. Note that the rotation of the container 500 around the rotation axis B may be realized by a configuration other than that described above.

The upper grasping portion 213 and lower grasping portion 214 may be configured such that the length thereof can be adjusted. By configuring the upper grasping portion 213 and lower grasping portion 214 such that the length thereof can be adjusted, the grasping unit can grasp containers 500 having various sizes and the position (height) of the container 500 grasped by the grasping unit can be easily adjusted. The length adjustment function may be realized using known means. For example, the upper grasping portion 213 and lower grasping portion 214 may consist of a first portion and a second portion that can be slid and fixed in any position.

The surface lighting 220 (lighting) applies light to the liquid charged in the container 500. For example, the surface lighting 220 has a shape corresponding to the shape of the body 210, such as a rectangular shape, in a front view. The surface lighting 220 may have a shape other than that described above.

For example, the surface lighting 220 is disposed on the side opposite to the camera 300-disposed side of the container 500 or grasping unit. In other words, referring to FIG. 1, the surface lighting 220 is disposed on the surface on the side opposite to the motor 240-located side of the flat portion 211 of the body 210. According to this configuration, the surface lighting 220 applies light to the camera 300 through the container 500. That is, the surface lighting 220 can be said to be disposed on the body 210 such that it applies light to the camera 300 through the container 500.

Since the surface lighting 220 is disposed on the flat portion 211 of the body 210, it can also be said to be formed integrally with the body 210 including the upper grasping portion 213 and lower grasping portion 214. Thus, for example, when the container 500 grasped by the upper grasping portion 213 and lower grasping portion 214 is inclined, the surface lighting 220 is also inclined in synchronization with the inclination of the container 500.

The markers 230 are mechanisms for acquiring the rotation angle on the basis of image data captured by the camera 300. The markers 230 are, for example, rectangular or circular light-non-transmissive films having a size of about 0.5 mm square, or the like and are disposed in predetermined locations on the surface lighting 220. The markers 230 may be two-dimensional codes including any information, or the like.

The markers 230 are disposed in the predetermined positions on the surface lighting 220 so that at least one marker 230 is seen in image data acquired by the fixedly disposed camera 300 even when the container 500 is inclined. FIG. 2 shows an example of the disposition positions of the markers 230. For example, in FIG. 2, the markers 230 are disposed in two positions, a position outside the container 500 that is not inclined and near the left side surface of the container 500 and a position outside the container 500 that is not inclined and near the right side surface of the container 500. Also, in FIG. 2, the markers 230 are disposed at a height similar to that of the rotation axis A, which is an axis around which the container 500 is inclined.

The markers 230 may be disposed in positions other than those described above as long as at least one marker 230 is seen in an image of the liquid captured when the container 500 is inclined. Also, the number of markers 230 to be disposed may be any number such as one or three or more.

Also, the markers 230 may be disposed on a place other than the surface lighting 220 as long as the place is a place that moves in synchronization with the body 210 including the upper grasping portion 213 and lower grasping portion 214. For example, the markers 230 may be protrusions that protrude toward the container 500 from positions of the body 210 located on the sides of the grasped container 500, or the like. The markers 230 may be realized using a method other than that described above.

The motor 240 functions as rotation means that inclines and swings the container 500 grasped by the upper grasping portion 213 and lower grasping portion 214 by rotating itself in accordance with power supplied from outside and thus inclining the body 210. In other words, the motor 240 functions as an inclination unit that at least inclines the container 500 around the rotation axis A, which is a first axis. In the present embodiment, the motor 240 inclines and swings the container 500 around the rotation axis A in accordance with an instruction from the rotation controller 260. The motor 240 is coupled to the flat portion 211 and is able to incline and swing the body 210 by rotating itself.

FIG. 3 shows an example of states in which the container 500 grasped by the upper grasping portion 213 and lower grasping portion 214 is inclined. As shown in FIG. 3, the motor 240 is able to incline the container 500 in the forward direction (for example, the counterclockwise direction) in a front view, as well as to incline the container 500 in the reverse direction (for example, the clockwise direction). For example, the motor 240 is able to incline and swing the container 500 around the rotation axis A such that the state of the container 500 makes transitions in the order of a state in which the container 500 is not inclined (0°), a state in which the container 500 is inclined by 90° in the forward direction, a state in which the container 500 is not inclined, a state in which the container 500 is inclined by 90° in the reverse direction, and a state in which the container 500 is not inclined. That is, the motor 240 is able to swing the container 500 around the rotation axis A while switching between the forward direction and reverse direction.

When capturing image data using the camera 300, it is preferable that the region of interest (liquid inside and bottle bottom) as shown in FIG. 4 efficiently fall within the angle of view of the camera 300 even when the container 500 is inclined. For this reason, for example, as shown in FIG. 5, it is preferable that the height of the rotation axis Abe matched with the height B of the liquid surface or the height C of the central portion of the liquid (or a height between the height B of the liquid surface and the height C of the central portion of the liquid, or the like) when the container 500 is not inclined rather than the height A of the center of the container 500 when the container 500 is not inclined. For example, in the inspection apparatus 200 according to the present embodiment, the position of the rotation axis A around which the body 210, the grasped container 500, and the like are inclined is determined in accordance with the height of the junction of the motor 240 and flat portion 211. By adjusting the length of the upper grasping portion 213 or lower grasping portion 214, the positional relationship between the rotation axis A and the container 500 or the liquid charged in the container 500 can be adjusted. For this reason, it can be said that it is preferable that the height of the junction of the motor 240 and flat portion 211 or the length of the upper grasping portion 213 or lower grasping portion 214 be previously determined or properly modified in accordance with the size of the container 500, the amount of liquid such as the height B of the liquid surface or the height C of the central portion of the liquid, or the like so that the position of the rotation axis A becomes a preferable position.

The angle by which the motor 240 inclines the container 500 is not limited to up to 90°. For example, the angle by which the motor 240 inclines the container 500 may be properly determined in accordance with the liquidity of the liquid charged in the container 500, the properties of foreign matters desired to be detected, or the like. When inclining the container 500 in the forward direction and reverse direction, the angle by which the container 500 is inclined in the forward direction and the angle by which it is inclined in the reverse direction may be different or the speeds at which the container 500 is inclined in the respective directions may be different. After the container 500 is inclined, the inclined container 500 may be held stationary for a predetermined time.

The present inventors conducted an experiment as follows: the container 500 whose about half portion contains a low-viscosity liquid and that is not inclined was inclined to $\theta1°$ in the forward direction at speed v1, held stationary for T1 seconds, then inclined to $\theta2°$ in the reverse direction (that is, inclined to $-\theta2°$) at speed v2, held stationary for T2 seconds, and then restored to a non-inclined state at speed v3. The present inventors then found that foreign matters having different specific gravities or sizes are easily suspended in the liquid when the values have the following relationships.

$\theta1 \geq \theta2$ (for example, $\theta1=110°$, $\theta2=80°$)
v2≥v1>v3 (for example, v3 is about half of v2)
T1≥T2 (for example, T1=0.5 s, T2=0.3 s)

The motor 240 may incline the container 500 as described above in accordance with an instruction from the rotation controller 260. The operation of the motor 240 may be a part of the operation described above.

The motor 250 rotates the container 500 grasped by the upper grasping portion 213 and lower grasping portion 214 around the rotation axis B by rotating itself in accordance with power supplied from outside. In other words, the motor 250 functions as a change unit that changes the area of the container 500 imaged by the camera 300 by rotating the container 500 around the rotation axis B, which is a second axis different from the first axis. In the present embodiment, as with the motor 240, the motor 250 rotates the container 500 in accordance with an instruction from the rotation controller 260. For example, the motor 250 is coupled to a rotating portion included in the upper grasping portion 213 of the body 210 and rotates the container 500 around the rotation axis B by rotating itself and thus rotating the rotating portion.

FIG. 6 shows an example of a state in which the container 500 is rotated around the rotation axis B. As shown in FIG. 6, the motor 250 rotates the container 500 in the forward direction (for example, the counterclockwise direction) in a plan view. For example, the motor 250 is able to rotate the container 500 around the rotation axis B such that the state of the container 500 makes transitions in the order of a state in which the container 500 is not rotated (0°), a state in which the container 500 is rotated by 90° in the forward direction, and a state in which the container 500 is not rotated (0°). By rotating the container 500 around the rotation axis B by 90° as described above, an area near an edge of the container 500 seen from the camera 300 before the rotation comes near the center of the container 500 seen from the camera 300 after the rotation. For example, when the diameter of the container 500 is about 4 cm, it is difficult to detect foreign matters within a range of about 5 to 6 mm from the edges of the container due to cylindrical lens effects. In the present embodiment, the container 500 is rotated as described above. Thus, even if foreign matters are present in the foreign matter undetectable range before or after the rotation, the foreign matters can be detected after or before the rotation.

The speed at which the motor 240 inclines and swings the container 500 and the speed at which the motor 250 rotates the container 500 may be different. For example, the motor 250 rotates the container 500 slowly (for example, at a predetermined speed) so that foreign matters do not rise in the container 500. In other words, the motor 250 rotates the container 500 such that the rotation of the container 500 by the motor 250 does not affect the detection of foreign matters. A rise of foreign matters due to the rotation of the container 500 by the motor 250 means that the foreign matters rise due to a factor other than an inclination or swing of the container 500 by the motor 240. This may result in a reduction in the accuracy with which foreign matters or bubbles are determined. For this reason, the motor 250 slowly rotates the container 500 so that the rotation of the container 500 by the motor 250 is prevented from affecting detection of foreign matters as much as possible. The specific rotation speed may be adjusted properly.

The rotation controller 260 is an information processing apparatus that controls the rotation of the motor 240 and motor 250. For example, the rotation controller 260 starts rotation control to rotate the motor 240 and motor 250 in a predetermined order, in accordance with a start instruction from a start/end instruction unit 441. Specifically, the rotation controller 260 performs rotation control in accordance with a predetermined program stored in a storage unit included in the rotation controller 260 or the like on the basis of the start instruction. Also, the rotation controller 260 ends the rotation control, for example, when it performs the rotation control in the predetermined order to the last or when it receives an end instruction from the start/end instruction unit 441.

FIG. 7 shows an example of control performed by the rotation controller 260. Referring to FIG. 7, the rotation controller 260 waits for a predetermined time in accordance with a rotation instruction. While the rotation controller 260 waits, the detection/determination apparatus 400 (to be discussed later) generates a first background model (or the camera 300 acquires image data for generating a first background model). After waiting for the predetermined time, the rotation controller 260 causes the motor 250 to rotate the container 500 by 90°. After the motor 250 rotates the container 500, the rotation controller 260 waits for a predetermined time. While the rotation controller 260 waits, the detection/determination apparatus 400 generates a second background model (or the camera 300 acquires image data for generating a second background model). After waiting for the predetermined time, the rotation controller 260 causes the motor 240 to incline and swing the container 500. After the motor 240 inclines and swings the container 500, the rotation controller 260 waits for a predetermined time. While the rotation controller 260 waits, the detection/determination apparatus 400 detects foreign matters using the generated second background model. After waiting for the predetermined time, the rotation controller 260 causes the motor 250 to rotate the container 500 by −90°. Thus, the container 500 is restored to the state before the rotation. After the container 500 is rotated by −90°, the detection/determination apparatus 400 detects foreign matters using the first background model.

As described above, the rotation controller 260 rotates the motor 240 and motor 250 in the predetermined order. The wait time at each timing may be set arbitrarily. The wait times may be the same or different. The detection/determination apparatus 400 (to be discussed later) generates a background model at each timing and detects foreign matters using the generated background model. As will be described later, the detection/determination apparatus 400 detects foreign matters using a background model, as well as detects and determines foreign matters without using a background model. For example, as will be described later, a detection/determination process without using a background model is started with the start of an inclination and swing of the container 500 by the motor 240 and is continued until the detection of foreign matters using the first background model is complete.

While FIG. 7 shows an example of control performed by the rotation controller 260, control performed by the rotation controller 260 is not limited to the example shown in FIG. 7. For example, in FIG. 7, the detection/determination apparatus 400 starts to detect foreign matters using a background model immediately after the container 500 is inclined and swung by the motor 240 or rotated by the motor 250. However, the detection/determination apparatus 400 may detect foreign matters after the container 500 is inclined and swung by the motor 240 or rotated by the motor 250 and then a predetermined time elapses. Also, in FIG. 7, the speed at which the motor 250 rotates the container 500 by 90° and the speed at which it rotates the container 500 by −90° are equal. However, the speed at which the motor 250 rotates the container 500 by 90° and the speed at which it rotates the container 500 by −90° may be different. For example, the speed at which the motor 250 rotates the container 500 by 90° may be lower than the speed at which it rotates the container 500 by −90°. By reducing the speed at which the motor 250 rotates the container 500 by 90°, a rise of foreign matters or the like in the container 500 due to the rotation of the container 500 by the motor 250 can be suppressed in the period between the first background model generation period and the second background model generation period.

The rotation controller 260 may cause the motor 240 to incline and swing the container 500 such that foreign matters having different specific gravities or sizes described above are easily suspended in the liquid. FIG. 8 shows an example of control performed when the motor 240 inclines and swings the container 500 such that foreign matters having different specific gravities or sizes are easily suspended in the liquid. Referring to FIG. 8, the rotation controller 260 controls the motor 240 so that the container 500 in a non-inclined state is inclined to θ1° in the forward direction around the rotation axis A at speed v1, held stationary for T1 seconds, then inclined to θ2° in the reverse direction around the rotation axis A at speed v2, held stationary for T2 seconds, and then restored to a non-inclined state at speed v3. Here, θ1≥θ2 (for example, θ1=110°, θ2=80°), v2≥v1>v3 (for example, v3 is about half of v2), and T1≥T2 (for example, T1=0.5 s, T2=0.3 s). The rotation controller 260 may perform control as shown in FIG. 8.

The camera 300 is an imaging apparatus that acquires image data by imaging the container 500. For example, the camera 300 is previously disposed in a predetermined position on the side opposite to the surface lighting 220-located side seen from the upper grasping portion 213 or lower grasping portion 214. As shown in FIG. 1, the inspection apparatus 200 and camera 300 are not formed integrally. For this reason, even when the body 210 and the like are inclined, the camera 300 is not inclined. That is, in the present embodiment, the camera 300 acquires image data in a state in which it is fixed to the predetermined position.

For example, the camera 300 acquires image data at a high frame rate of about 150 to 200 fps in accordance with a start instruction from the start/end instruction unit 441 (to be discussed later). The camera 300 then transmits the acquired image data to the detection/determination apparatus 400 together with information indicating the imaging time, and the like. The camera 300 may acquire image data at a frame rate other than that described above.

Foreign matters in the liquid charged in the container 500 are more likely to be present in the region of interest (that is, liquid inside or bottle bottom) as shown in FIG. 4. For this reason, it is preferable to dispose the camera 300 such that it can efficiently image the region of interest. For example, it is preferable to determine the disposition position of the camera 300 such that the center of the camera 300 is located in a position higher than the lower edge of the container 500 and the entire bottom surface (bottle bottom) of the container 500 can be imaged from as close a position as possible to the extent that the depth of field is maintained. It is also preferable to use a wide-angle lens in the camera 300. By disposing the camera 300 in such a manner, for example, foreign matters that have a large mass and are not suspended, or the like can be detected without missing them.

It is also preferable to dispose the camera 300 such that the entire liquid charged in the container 500 is imaged and the region in which the liquid inside and bottle bottom overlap each other becomes as small as possible. For example, where possible, it is preferable to dispose the camera 300 such that it images the liquid from a direction parallel to the liquid surface.

In sum, it can be said that it is preferable to dispose the camera 300 in, for example, a position as shown in FIG. 9. Referring to FIG. 9, the camera 300 is disposed such that the center thereof is located in a position equal to or lower than the liquid surface and higher than the bottle bottom, and it is recognized that the entire bottle bottom can be imaged. It is also recognized that the camera 300 is disposed such that the height of the center of the camera 300 is lower than the height of the liquid surface and is as equal as possible to the height of the liquid surface.

The detection/determination apparatus 400 is an information processing apparatus that performs a process of detecting objects in the container 500 in which the liquid is charged and determining foreign matters on the basis of image data acquired by the camera 300, or the like. For example, the detection/determination apparatus 400 generates background models before and after the motor 250 rotates the container 500 and detects precipitates using the generated background models. The detection/determination apparatus 400 also determines foreign matters on the basis of results of tracking of the detected objects without using the background models. In the present embodiment, the term "precipitate" refers to a solid present in a lower portion of the liquid.

FIG. 10 shows an example of the configuration of the detection/determination apparatus 400. Referring to FIG. 10, the detection/determination apparatus 400 includes, as main components, for example, a screen display unit 410, a communication I/F unit 420, a storage unit 430, and an arithmetic processing unit 440. Note that the detection/determination apparatus 400 may include a component other than those described above, such as an operation input unit including a keyboard, a mouse, and the like that receives an input operation from an operator.

The screen display unit 410 consists of a screen display apparatus, such as a liquid crystal display (LCD). The screen display unit 410 displays, on a screen, various types of information such as image information 431, background information 432, tracking information 433, and determination result information 434, stored in the storage unit 430 in accordance with an instruction from the arithmetic processing unit 440.

\*

The communication I/F unit 420 consists of a data communication circuit. The communication IN unit 420 performs data communication with the camera 300, the rotation controller 260, external devices, and the like connected through a communication line.

The storage unit 430 is a storage device such as a hard disk or memory. The storage unit 430 stores process information and a program 435 required for the arithmetic processor 440 to perform various types of processes. When the program 435 is read and executed by the arithmetic processor 440, the respective processing units are implemented. The program 435 is previously read from an external device or storage medium by a data input/output function such as the communication I/F unit 420 and stored in the storage unit 430. Examples of main information stored in the storage unit 430 include the image information 431, background information 432, tracking information 433, determination result information 434, and the like.

The image information 431 includes image data acquired by the camera 300. In the image information 431, for example, each image data and information indicating the date and time when the camera 300 acquired the image data (information indicating the imaging time) are associated with each other.

The background information 432 includes background models generated by a background model generation unit 443. As described above, background models to be generated include a first background model and a second background model. For this reason, the background information 432 includes a first background model and a second background model.

As described above with reference to FIG. 7, a first background model is generated on the basis of image data acquired after a start instruction is received and before the motor 250 starts to rotate the container 500. A second background model is generated on the basis of image data acquired after the motor 250 rotates the container 500 by 90° and before the motor 240 rotates the container 500. Due to such a relationship, the appearance of the container 500 varies between the first background model and second background model. For example, an edge portion of the container 500 in the first background model comes near the center of the container 500 in the second background model.

The tracking information 433 includes information corresponding to results of tracking performed by a tracking unit 446. For example, in the tracking information 433, identification information given to each object and time-series information indicating the position of the object are associated with each other. The time-series information indicating the position of the object includes, for example, time information and position information, such as coordinates, indicating the position of the object at each time.

The tracking information 433 may include time-series information other than the position of each object, such as angle information indicating the angle of the container 500 or information indicating the area of the detection region. The position information, such as the coordinates, indicating the position of the object may indicate XY coordinates in each image data. It may also indicate coordinates obtained by modifying XY coordinates in each image data on the basis of the information indicating the angle of the container 500 (for example, coordinates obtained by modifying to a position in the container 500 that is not inclined).

The determination result information 434 includes information indicating determination results obtained by a determination unit 448. For example, in the determination result information 434, identification information given to each object and information indicating determination results obtained by the determination unit 448 on the basis of the tracking information 433 are associated with each other. Specifically, the determination result information 434 includes information indicating to which of a foreign matter, a bubble, a scratch or stain on the container, a precipitate, and the like each detected object corresponds.

The arithmetic processing unit 440 includes an arithmetic device, such as a CPU, and peripheral circuits thereof. By reading the program 435 from the storage unit 430 and executing it, the arithmetic processing unit 440 makes the above hardware and program 435 cooperate with each other to implement respective processing units. Examples of main processing units implemented by the arithmetic processing unit 440 include the start/end instruction unit 441, an image acquisition unit 442, the background model generation unit 443, a precipitate detection unit 444, a detection unit 445, the tracking unit 446, an angle information acquisition unit 447, the determination unit 448, an output unit 449, and the like.

The start/end instruction unit 441 transmits a start instruction and an end instruction to the rotation controller 260, camera 300, and the like. For example, the start/end instruction unit 441 transmits a start instruction to the rotation controller 260 and camera 300 in accordance with an instruction from an external device, input of an instruction through the operation input unit, or the like. The start/end instruction unit 441 also transmits an end instruction to the rotation controller 260 and camera 300, for example, when it receives an instruction from an external device or operation input unit, when the determination unit 448 determines predetermined objects such as foreign matters, or when the precipitate detection unit 444 detects precipitates.

The timing when the start/end instruction unit 441 transmits a start instruction or the timing when it transmits an end instruction may be a timing other than those described above. For example, the start/end instruction unit 441 may transmit a start instruction when the camera 300 or the like detects the container 500.

The image acquisition unit 442 acquires, from the camera 300, image data and the like acquired by the camera 300 through the communication I/F unit 420. The image acquisition unit 442 then stores the acquired image data in the storage unit 430 as image information 431 such that the image data is associated with, for example, the acquisition date/time of the image data (information indicating the imaging time).

The background model generation unit 443 generates a background model on the basis of image data included in the image information 431. For example, the background model generation unit 443 generates a first background model or second background model on the basis of image data.

Specifically, for example, as shown in FIG. 7, the background model generation unit 443 generates a first background model on the basis of image data acquired after a start instruction is received and before the motor 250 starts to rotate the container 500. The background model generation unit 443 may generate a first background model using a known method, such as use of pixel values in image data or performance of a predetermined arithmetic operation based on pixel values. The background model generation unit 443 also generates a second background model on the basis of image data acquired after the motor 250 rotates the container 500 by 90° and before the motor 240 rotates the container 500. As with a first background model, the background model generation unit 443 may generate a second background model using a known method such as use of pixel values in image data or performance of a predetermined arithmetic operation based on pixel values.

For example, the detection/determination apparatus 400 has information indicating in what order the rotation controller 260 performs rotation control. Thus, by referring to this information, information indicating the date and time when each image data was acquired, the time when a start instruction was transmitted, and the like, the background model generation unit 443 is able to determine at what timing the image data was acquired. The background model generation unit 443 may determine the timing when each image data was acquired, using a method other than that described above.

The precipitate detection unit 444 detects precipitates on the basis of the image information 431 and background information 432. For example, the precipitate detection unit 444 detects precipitates present in positions equal to or lower than a predetermined position in the container 500 by extracting the difference with a background model included in the background information 432.

As described above, the precipitate detection unit 444 detects precipitates on the basis of image data acquired at a predetermined timing. Specifically, as shown in FIG. 7, the precipitate detection unit 444 detects precipitates by extracting the difference between image data acquired after the motor 240 inclines and swings the container 500 and before the motor 250 rotates the container 500 and the second background model. The precipitate detection unit 444 also detects precipitates by extracting the difference between image data acquired after the motor 250 rotates the container 500 by −90° and before a predetermined time elapses and the first background model.

As with the background model generation unit 443, the precipitate detection unit 444 is able to determine at what timing each image data was acquired by referring to the above information, information indicating the date and time when the image data was acquired, the time when a start instruction was transmitted, and the like. The precipitate detection unit 444 is also able to provide the detected precipitates with identification information such as IDs. The precipitate detection unit 444 may store the detection results in the storage unit 430 as determination result information 434.

The detection unit 445 detects objects present in the container 500 or in a region corresponding to the liquid charged in the container 500 on the basis of image data. For example, the detection unit 445 binarizes the image data and detects objects on the basis of the binarization results. The detection unit 445 may detect objects using another known technology.

The tracking unit 446 tracks the objects detected by the detection unit 445. As described above, the camera 300 acquires image data at a high frame rate such as 200 fps. From this, it is inferred that the positions of the same object in two pieces of image data whose imaging times are consecutive (the difference between whose imaging times is smaller than a predetermined value) are extremely close. For this reason, the tracking unit 446 compares the positions of objects detected by the detection unit 445 in image data acquired at one imaging time and the positions of objects detected by the detection unit 445 in image data acquired at the immediately preceding imaging time (or whose time difference is smaller than the predetermined value). If the distance between an object detected by the detection unit 445 in the image data acquired at the one imaging time and an object detected by the detection unit 445 in the image data acquired at the immediately preceding imaging time is equal to or smaller than a predetermined threshold, the tracking unit 446 determines that these objects are the same object. In this case, the tracking unit 446 provides the object detected by the detection unit 445 in the image data acquired at the one imaging time with identification information such as an ID provided to the object in the image data acquired at the immediately preceding imaging time determined as the same object. On the other hand, if the image data acquired in the immediately preceding imaging time (or whose time difference is smaller than the predetermined value) does not include an object whose distance with any object detected by the detection unit 445 in the image data acquired at the one imaging time is equal to or smaller than the predetermined threshold, the tracking unit 446 determines that the objects detected by the detection unit 445 in the image data acquired at the one imaging time are new objects. In this case, the tracking unit 446 provides those objects with new identification information such as IDs.

As described above, the tracking unit 446 provides the objects detected by the detection unit 445 with the identification information by performing tracking on the basis of the distance between the objects in the different pieces of image data. Further, the tracking unit 446 acquires coordinates indicating the positions of the objects detected by the detection unit 445. The tracking unit 446 then stores the identification information, time information indicating the imaging time of the image data, and the coordinates in the storage unit 430 as tracking information 433 such that these pieces of information are associated with each other. Note that the tracking unit 446 may store the XY coordinates of objects in each image data in the storage unit 430 as tracking information 433 or store, in the storage unit 430 as tracking information 433, coordinates obtained by modifying the XY coordinates of the objects in the image data on the basis of information indicating the angle of the container 500 acquired by the angle information acquisition unit 447 (for example, coordinates obtained by modifying to positions on the container 500 that is not inclined).

The angle information acquisition unit 447 acquires angle information indicating the angle by which the container 500 is inclined, on the basis of the positions of the markers 230 in the image data. For example, calibration is previously performed between the inclination angle of the container 500 and the positions of the markers 230 in image data. Thus, the angle information acquisition unit 447 is able to acquire angle information indicating the angle by which the container 500 is inclined, on the basis of the positions of the markers 230 in image data.

After acquiring the angle information, the angle information acquisition unit 447 stores the acquired angle information in the storage unit 430 together with time information indicating the imaging time of the image data, and the like. As described above, the angle information acquisition unit 447 may store the angle information in the storage unit 430 as one of pieces of information included in the tracking information 433.

The determination unit 448 determines to which of a bubble, a foreign matter, and a scratch or stain on the container 500 each object detected by the detection unit 445 corresponds, on the basis of the tracking information 433. In the present embodiment, the determination unit 448 makes this determination on the basis of time-series information acquired when the container 500 is swinging, as well as makes this determination on the basis of time-series acquired after the swing is complete (that is, after the container 500 stops in a state shown in FIG. 1). Note that the determination unit 448 determines whether the container 500 is swinging, on the basis of the angle information included in the tracking information 433 or the like.

For example, the determination unit 448 determines whether each object detected by the detection unit 445 is a scratch or stein on the container 500 or an object adhering to the container 500, on the basis of the time-series information acquired when the container 500 is swinging included in the tracking information 433. As described above, the markers 230 are disposed on the surface lighting 220 disposed on the body 210 that is inclined in synchronization with the container 500. For this reason, a scratch or stain on the container 500, an object adhering to the outside of the charged liquid, or the like moves in cooperation with the movement of the markers 230. As used herein, the term "cooperation" means that the markers 230 and a scratch or stain on the container 500, an object adhering to the outside of the charged liquid, or the like completely cooperate with each other so that when the markers 230 start to move, the scratch or stain on the container 500 or the like starts to move immediately and when the markers 230 stops the movement, the scratch or stain on the container 500 or the like stops the movement immediately. For this reason, the determination unit 448 determines that an object that moves in cooperation with the movement of the markers 230 among the objects detected by the detection unit 445 is a scratch or stain on the container 500, an adhering object, or the like, on the basis of the time-series information acquired when the container 500 is swinging. On the other hand, the determination unit 448 determines that an object that does not move in cooperation with the movement of the markers 230 among the objects detected by the detection unit 445 is not a scratch or stain of the container 500, an adhering object, or the like. That is, the determination unit 448 determines that the object that does not move in cooperation with the movement of the markers 230 may be a bubble or foreign matter.

The determination unit 448 also determines which of a bubble and a foreign matter each object detected by the detection unit 445 is, on the basis of time-series information acquired after the swing of the container 500 is complete included in the tracking information 433. The determination unit 448 makes this determination with respect to objects except for objects that the determination unit 448 has determined as scratches or stains of the container or adhering objects among all the objects detected by the detection unit 445. For example, if the determination unit 448 determines that an object is moving upward, on the basis of the time-series information acquired after the swing is complete, it determines that the object is a bubble. On the other hand, if the determination unit 448 determines that an object is moving downward, on the basis of the time-series information acquired after the swing is complete, it determines that the object is a foreign matter. As seen above, the determination unit 448 is able to determine which of a bubble and a foreign matter each object is, on the basis of the movement direction of the object indicated by the time-series information acquired after the swing is complete. Note that the determination unit 448 may determine bubbles or foreign matters using a method other than that described above, such as making the above determination using a previously learned model or the like.

As described above, the determination unit 448 determines scratches on the container 500, or the like among the objects and then determines which of bubbles or foreign matters the remaining objects are. The determination unit 448 then stores the determination results of the objects detected by the detection unit 445 in the storage unit 430 as determination result information 434. In the present embodiment, the timing when the determination unit 448 makes a determination is not limited to a particular timing. For example, the determination unit 448 may be configured to determine in real time whether each object is a scratch or the like, for example, when the container 500 is swinging. The determination unit 448 may also perform the above series of processes after both the time-series data acquired when the container 500 is swinging and the time-series data acquired after the swing is complete are obtained.

The determination unit 448 may be configured to make a determination with respect to cooperation with the markers 230 and a determination with respect to a bubble or foreign matter in parallel. That is, the determination unit 448 may start a determination as to which of a bubble and a foreign matter each object is, before the swing is complete. The determination unit 448 may also use information other than the tracking information 433 when determining each object. For example, the determination unit 448 may determine each object using information indicating image characteristics, size, average luminance value, or the like of the object together with the tracking information 433. By making a determination using information other than the movement, such as the size or average luminance value of the object, together with the tracking information 433, the determination unit 448 is able to comprehensively determine the characteristics of bubbles or foreign matters and thus to obtain higher determination accuracy.

As described above, the container 500 is rotated by the motor 250 while the determination unit 448 makes a determination. Thus, even if cylindrical lens effects are produced, foreign matters or the like can be accurately detected without missing them. Also, the container 500 is rotated by the motor 250 at a predetermined speed so that the rotation of the container 500 by the motor 250 does not affect the detection of foreign matters. Thus, the determination unit 448 is able to determine foreign matters without having to consider the effect of the rotation of the container 500 by the motor 250.

The output unit 449 outputs at least one of the image information 431, background information 432, tracking information 433, determination result information 434, and the like. For example, the output unit 449 displays at least one of the image information 431, background information 432, tracking information 433, determination result information 434, and the like on the screen of the screen display unit 410 or transmits such information to an external device through the communication I/F unit 420.

The example of the configuration of the detection/determination apparatus 400 has been described above.

The detection/determination apparatus 400 may have a configuration other than that described above. For example, before making an swing start instruction, the detection/determination apparatus 400 may makes, to the inspection apparatus 200, an instruction to rotate the container 500 in order to peel foreign matters or the like stuck to the wall surface of the container 500. That is, the detection/determination apparatus 400 may be configured to make a rotation instruction and then a swing start instruction. Such a rotation operation may be controlled by the rotation controller 260.

The container 500 is a translucent container such as a glass bottle or PET bottle. The liquid such as water or drug is charged in the container 500. The container 500 may have scratches, stains, or the like thereon. The container 500 may also contain foreign matters. Conceivable examples of the foreign matters include rubber pieces, hairs, fiber pieces, soot, glass or plastic pieces, and the like.

The examples of the configuration of the inspection apparatus 200, camera 300, detection/determination apparatus 400, and container 500 included in the inspection system 100 have been described above. Next, referring to FIGS. 11 to 14, an example of the operation of the inspection system 100 will be described.

First, referring to FIG. 11, an example of the general operation of the entire inspection system 100 will be described. FIG. 11 shows an example of the operation of the inspection system 100. Referring to FIG. 11, the start/end instruction unit 441 transmits a start instruction to the rotation controller 260 and camera 300 in accordance with an instruction from an external device, input of an instruction through the operation input unit, or the like (step S101). In response, the camera 300 starts to acquire image data, and the rotation controller 260 starts rotation control.

After the start instruction is transmitted, a detection/determination operation is performed at each timing (step S102). Examples of the detection/determination operation include detection operations performed by the background model generation unit 443 and precipitate detection unit 444 using background models, detection/determination operations performed by the detection unit 445, tracking unit 446, and determination unit 448, and the like. Details of the operations included in S102 will be described later.

If any predetermined condition is met in step S102, for example, if the determination unit 448 determines predetermined objects such as foreign matters or if the precipitate detection unit 444 detects precipitates (step S103: Yes), the start/end instruction unit 441 transmits an end instruction to the rotation controller 260 and camera 300 (step S104). Thus, even if the rotation controller 260 is in the middle of performing rotation control in a predetermined order, the inspection system 100 ends the inspection.

Even if any predetermined condition is not met, for example, even if the determination unit 448 does not determine predetermined objects such as foreign matters and the precipitate detection unit 444 does not detect precipitates (step S103: NO), the inspection system 100 ends the inspection when the rotation controller 260 performs rotation control to the end (step S105: YES). If the rotation controller 260 has yet to perform rotation control to the end (step S105: NO), the rotation controller 260 continues rotation control and the operations in step S102 are also continued.

The example of the general operation of the entire inspection system 100 has been described above. Next, referring to FIGS. 12 to 14, details of the operations in step S102 will be described.

First, referring to FIG. 12, the detection operations performed by the background model generation unit 443 and precipitate detection unit 444 using background models will be described in more detail. Referring to FIG. 12, the background model generation unit 443 generates a first background model on the basis of image data acquired after the start instruction is transmitted and before the motor 250 starts to rotate the container 500 (step S201).

The background model generation unit 443 also generates a second background model on the basis of image data acquired after the motor 250 rotates the container 500 and before the motor 240 starts to incline and swing the container 500 (step S202).

The precipitate detection unit 444 detects precipitates using the second background model on the basis of image data acquired after the motor 240 inclines and swings the container 500 and before the motor 250 starts to rotate the container 500 again (step S203). For example, the precipitate detection unit 444 detects precipitates present in a lower position of the container 500 by extracting the difference between the image data and the second background model.

The precipitate detection unit 444 also detects precipitates using the first background model on the basis of image data acquired after the motor 250 rotates the container 500 again and before a predetermined time elapses (step S204).

An example of the detection operations using the background models has been described above. Next, referring to FIGS. 13 and 14, details of the detection/determination operations performed by the detection unit 445, tracking unit 446, and determination unit 448 will be described.

First, referring to FIG. 13, an example of object detection/tracking operations will be described. Referring to FIG. 13, the image acquisition unit 442 acquires, from the camera 300, image data acquired by the camera 300 through the communication I/F unit 420 (step S301).

The detection unit 445 detects objects present in the container 500 or a region corresponding to the liquid charged in the container 500 on the basis of the image data (step S302). The detection unit 445 may detect objects using a known technology. [0105]

The tracking unit 446 tracks the objects detected by the detection unit 445 (step S303). For example, the tracking unit 446 tracks the objects on the basis of the distance between the objects in pieces of image data whose imaging times are close (or consecutive).

If all the objects detected by the detection unit 445 in the image data have not been tracked yet (step S304: NO), the tracking unit 446 tracks objects that have yet to be tracked. On the other hand, if all the objects detected by the detection unit 445 in the image data have been tracked (step S304: YES), the tracking unit 446 completes the tracking.

The angle information acquisition unit 447 acquires angle information indicating the angle by which the container 500 is inclined, on the basis of the positions of the markers 230 in the image data (step S305).

If the image acquisition unit 442 has acquired all series of image data captured by the camera 300 (step S306: YES), the process is ended. On the other hand, if there is yet-to-be-acquired image data (step S306: NO), the image acquisition unit 442 acquires the image data from the camera 300 (step S301).

The example of the object detection/tracking operations of the detection/determination apparatus 400 has been described above. Note that the detection/determination apparatus 400 may perform the steps in an order other than that described above. For example, the detection/determination apparatus 400 may perform step S302 and later steps after it acquires all series of image data captured by the camera 300. Referring to FIG. 14, example operations of the determination unit 448 will be described.

Referring to FIG. 14, the determination unit 448 acquires time-series information acquired when the container 500 is swinging included in the tracking information 433 (step S401).

If there are objects that move in cooperation with the movement of the markers 230 among the objects detected by the detection unit 445 (step S402: YES), the determination unit 448 determines that the objects that move in cooperation with the movement of the markers 230 are scratches or stains on the container 500, adhering objects, or the like (step S403). The determination unit 448 then excludes the objects determined as scratches or stains on the container 500, adhering objects, or the like from objects to be determined in step S407 (step S404). On the other hand, if there are objects that do not move in cooperation with the movement of the markers 230 (step S402: NO), the determination unit 448 determines that the objects that do not move in cooperation with the movement of the markers 230 are not scratches or stains on the container 500, adhering objects, or the like (step S405).

The determination unit 448 also acquires time-series information acquired after the swing of the container 500 is complete included in the tracking information 433 (step S406). The determination unit 448 then determines which of a bubble and a foreign matter each object detected by the detection unit 445 is, on the basis of the time-series information acquired after the swing of the container 500 is complete included in the tracking information 433 (step S407). For example, the determination unit 448 determines which of a bubble and a foreign matter each object is, on the basis of the movement direction of the object indicated by the time-series information acquired after the swing is complete. The determination unit 448 may make this determination using a method other than that described above.

The example of the operation of the determination unit 448 has been described above. In the present embodiment, the timing when the determination unit 448 makes a determination is not limited to a particular timing. For example, the determination unit 448 may be configured to determine in real time whether each object is a scratch or the like, for example, when the container 500 is swinging. The determination unit 448 may also perform the series of steps after both time-series data acquired when the container 500 is swinging and time-series data acquired after the swing is complete are obtained.

As seen above, the inspection apparatus 200 includes the motor 240 serving as an inclination unit and the motor 250 serving as a change unit. According to this configuration, the inspection apparatus 200 is able to incline the container 500 using the motor 240, as well as to rotate the container 500 using the motor 250 to change the area of the container 500 imaged by the camera 300. As a result, the inspection apparatus 200 is able to suppress fixation of a foreign matter-undetectable region in image data acquired by the camera 300. Thus, the inspection apparatus 200 is able to accurately detect foreign matters present in the container.

In the present embodiment, the inspection system 100 has been described as changing the relative orientations of the container 500 and camera 300 around the rotation axis B by rotating the container 500 using the motor 250. However, the inspection system 100 may change the relative orientations of the container 500 and camera 300 by rotating the camera 300 around the rotation axis B rather than rotating the container 500. In this case, the camera 300 may be rotated using any mechanism.

In the present embodiment, the motor 250 has been described as rotating the container 500 by 90° and then restoring it to the state before the rotation. However, the motor 250 may rotate the container 500 in a manner other than that described in the present embodiment. For example, as with the motor 240, the motor 250 may be configured to rotate the container 500 in a 0° state by −90°.

In the present embodiment, the precipitate detection unit 444 has been described as detecting precipitates. However, the configuration of the detection/determination apparatus 400 is not limited to that described in the present embodiment. For example, the tracking unit 446 may be configured to track results of detection performed by the precipitate detection unit 444 in addition to objects detected by the detection unit 445. In this case, for example, the determination unit 448 may be configured to, when the tracking unit 446 determines that the objects have not moved, as results of the tracking, determine that the objects detected by the precipitate detection unit 444 are precipitates. As seen above, the determination unit 448 may be configured to determine precipitates on the basis of results of tracking performed by the tracking unit 446.

In the present embodiment, the case in which one information processing apparatus functions as the detection/determination apparatus 400 has been described. However, multiple information processing apparatuses connected through a network may function as the detection/determination apparatus 400. Also, in the present embodiment, the detection/determination apparatus 400 has been described as making a swing start instruction or swing stop instruction to the inspection apparatus 200. However, the inspection system 100 may include an apparatus different from the detection/determination apparatus 400 as an instruction apparatus that makes the above instructions.

Second Embodiment

Figure 15:
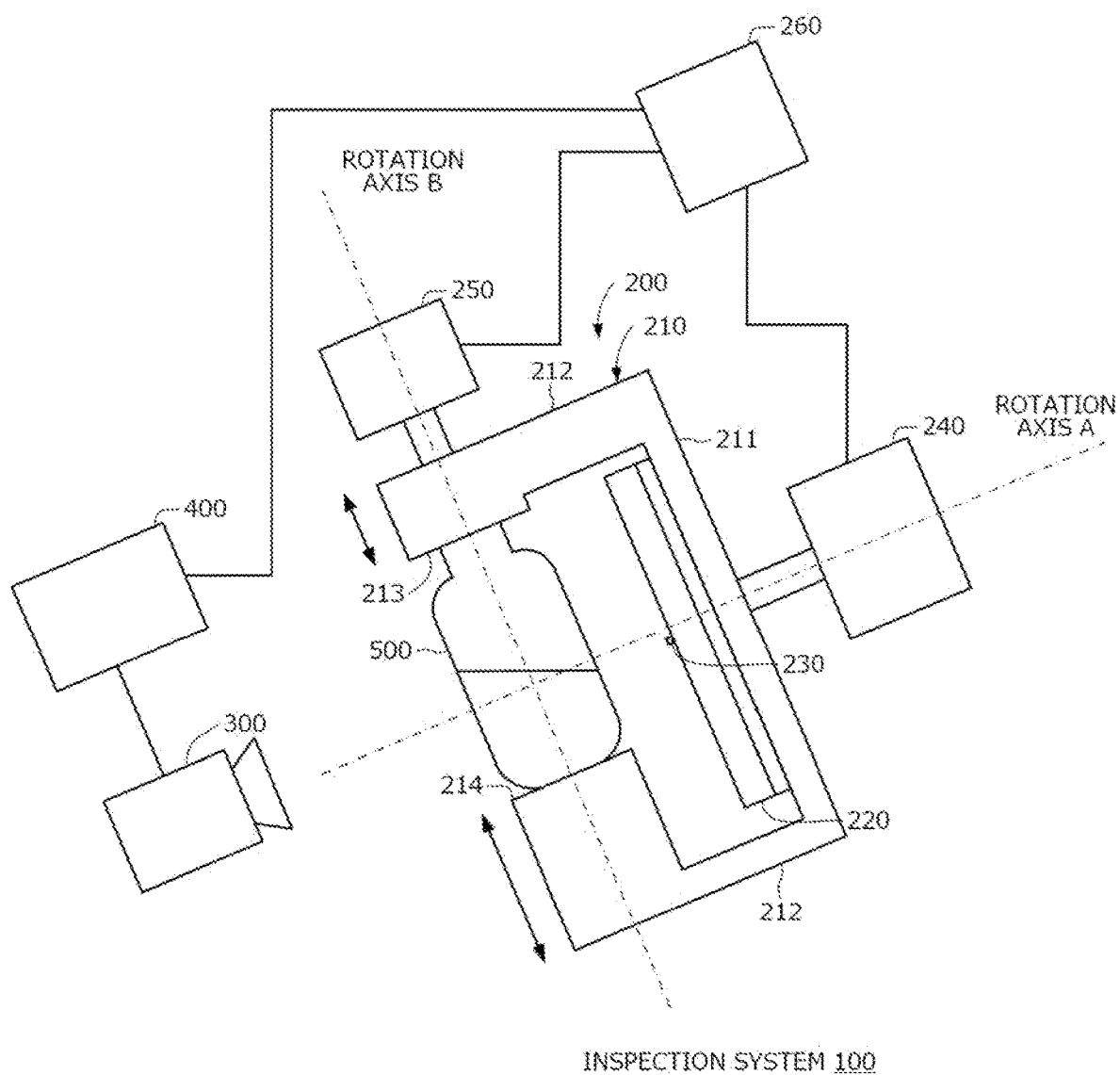
FIG. 15 is a diagram showing an example of the configuration of an inspection system according to a second embodiment of the present disclosure.
Figure 16:
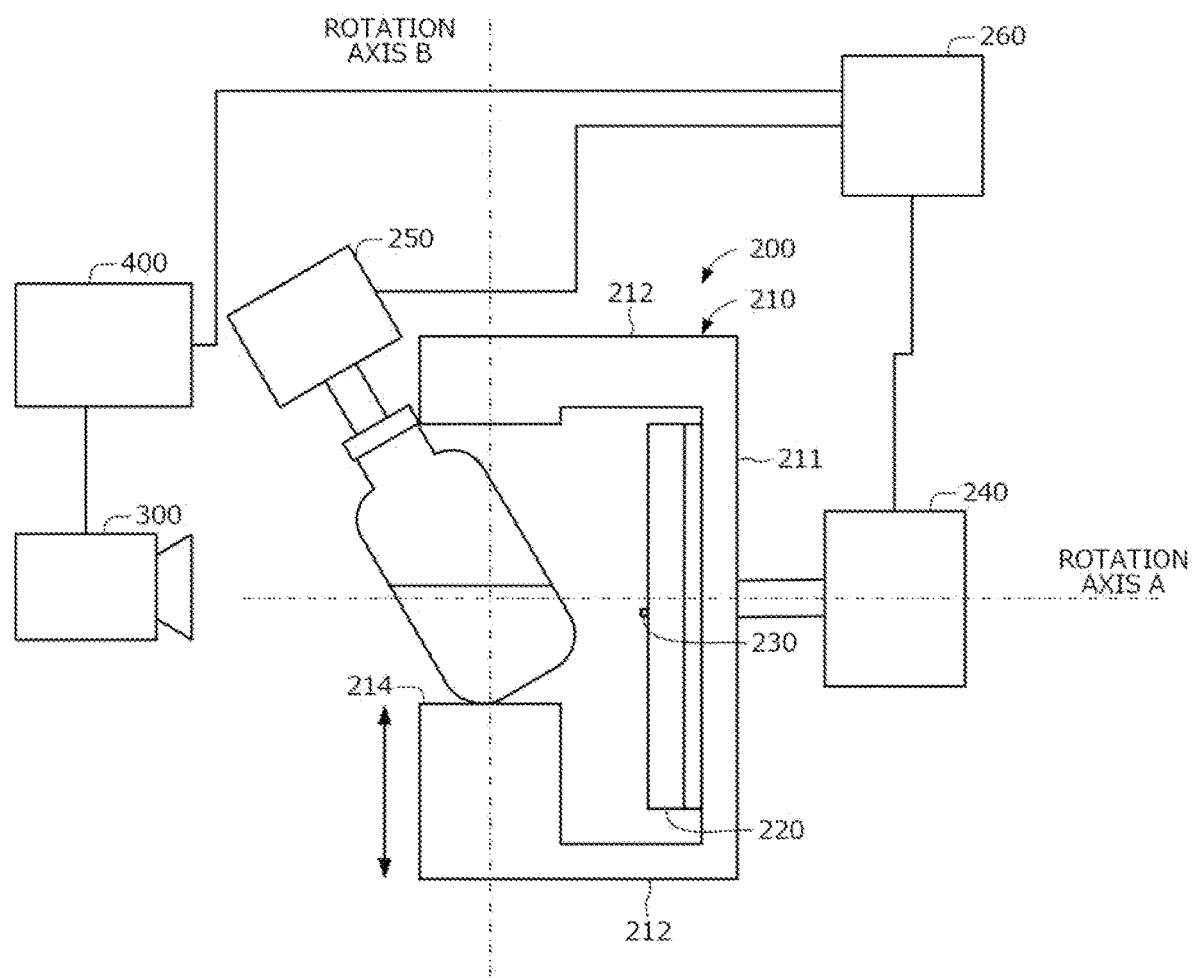
FIG. 16 is a diagram showing another example of the configuration of the inspection system.

Next, referring to FIGS. 15 and 16, a second embodiment of the present invention will be described. As shown in FIGS. 15 and 16, in the present embodiment, a case in which at least some of the components included in the inspection system 100 described in the first embodiment are inclined with respect to a predetermined reference plane such as the ground will be described.

As shown in FIG. 15, at least a body 210, a camera 300, and a container 500 are inclined. In other words, at least an inspection apparatus 200 and the camera 300 are inclined.

The specific inclination angle may be properly determined in accordance with the shape of the container, the characteristics of a liquid, or the like. Specifically, for example, the inspection apparatus 200 and camera 300 are inclined by about 20 to 30°. If the inclination angle is too small, it is more likely that precipitates fall on the back side of the bottle and do not move. That is, inclination effects may not be obtained. On the other hand, if the inclination angle is too large, the overlap between the liquid surface region and liquid inside region is increased, resulting in difficulty in separating bubbles on the liquid surface and precipitates from each other. For this reason, as described above, it is preferable to set a proper inclination angle in accordance with the shape of the container, the characteristics of the liquid, or the like.

By inclining the inspection system 100 as described above, precipitates become more likely to gather in the front half of the bottle, which is the region imageable by the camera 300. As a result, the inspection system 100 is able to detect precipitates or the like more accurately.

In the present embodiment, any configuration may be used to incline the inspection apparatus 200, camera 300, and the like. For example, the inspection apparatus 200 and the like may be inclined using known means. Specifically, the inspection apparatus 200 and the like may be inclined by inclining an installation base having the components of the inspection system 100 disposed thereon. Also, instead of inclining the inspection apparatus 200, camera 300, and the like together as shown in FIG. 15, only the container 500 (or only the container 500 and motor 250) may be inclined as shown in FIG. 16. By inclining at least the container 500 in this manner, similar advantageous effects can be obtained even if the entire inspection apparatus 200 is not inclined.

Third Embodiment

Figure 20:
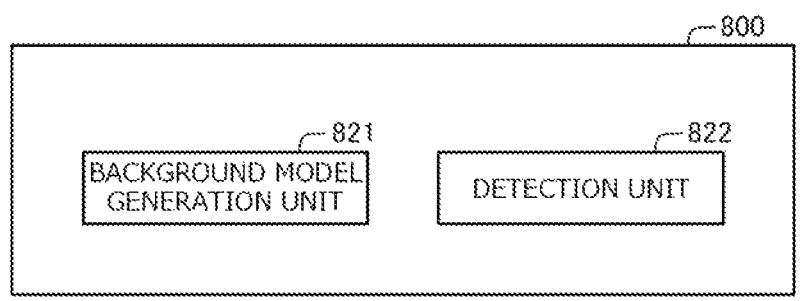
FIG. 20 is a block diagram showing an example of the configuration of the information processing apparatus.

Next, referring to FIGS. 17 and 20, a third embodiment of the present invention will be described. In the third embodiment according to the present invention, the configuration of an inspection apparatus 600 and the like will be outlined.

Figure 17:
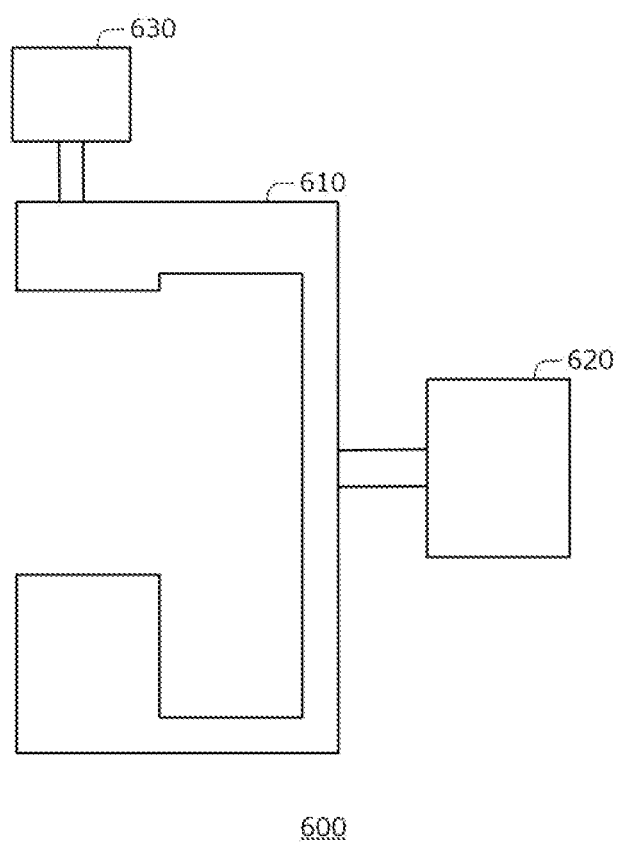
FIG. 17 is a diagram showing an example of the configuration of an inspection apparatus according to the second embodiment of the present disclosure.

FIG. 17 shows an example of the configuration of the inspection apparatus 600. Referring to FIG. 17, the inspection apparatus 600 includes a grasping unit 610, an inclination unit 620, and a change unit 630.

The grasping unit 610 grasps a container in which a liquid is charged.

The inclination unit 620 at least inclines the container around a first axis with the grasping unit 610 grasping the container. The inclination unit 620 is, for example, a motor and inclines the container by inclining the grasping unit 610.

The change unit 630 changes the area of the container imaged by an imaging apparatus by changing the relative orientations of the container and the imaging apparatus around a second axis different from the first axis. For example, in FIG. 17, the change unit 630 changes the relative orientations of the container and imaging apparatus by rotating the container grasped by the grasping unit 610 using a motor or the like. The change unit 630 may change the relative orientations of the container and imaging apparatus by rotating the imaging apparatus in place of the container.

As described above, the inspection apparatus 600 includes the inclination unit 620 and change unit 630. According to this configuration, the inspection apparatus 600 is able to incline the container using the inclination unit 620, as well as to change the relative orientations of the container and imaging apparatus using the change unit 630. As a result, the inspection apparatus 600 is able to suppress fixation of a foreign matter-undetectable region in image data acquired by the imaging apparatus. Thus, the inspection apparatus 600 is able to accurately detect foreign matters present in the container.

Figure 18:
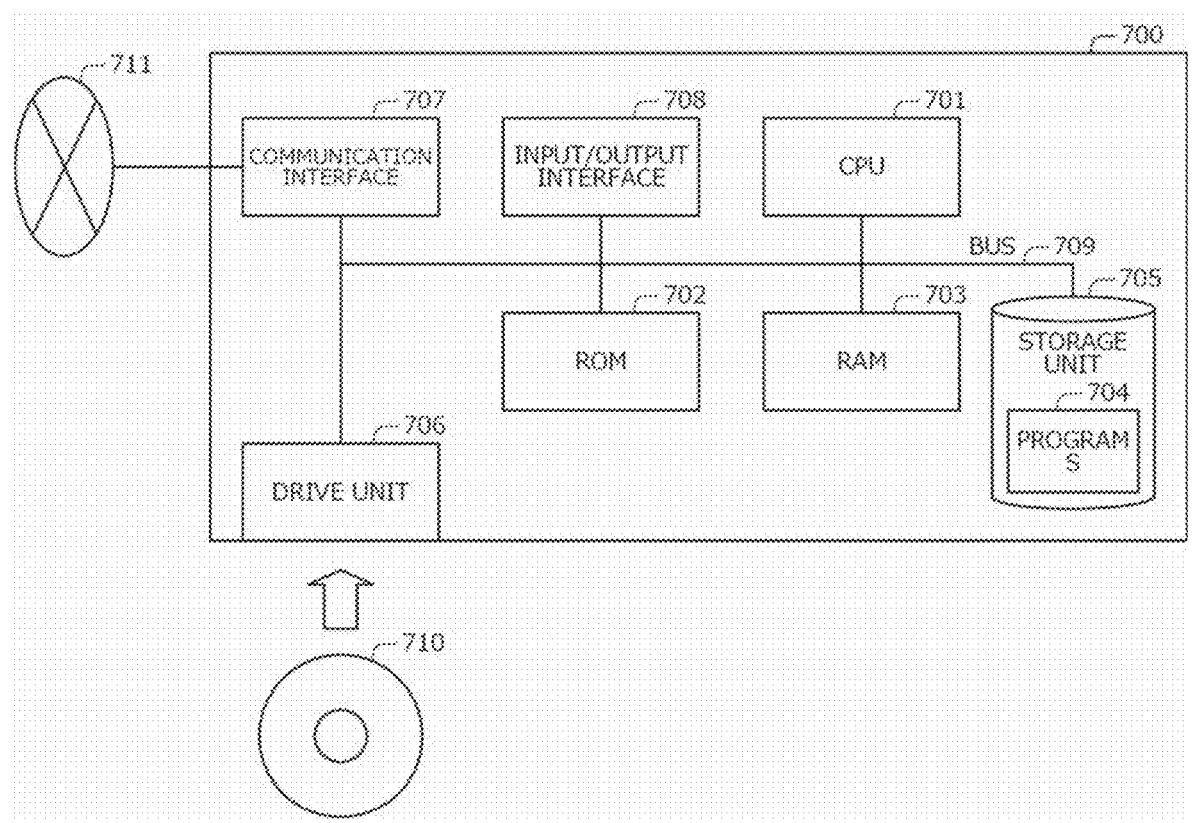
FIG. 18 is a diagram showing an example of the hardware configuration of an information processing apparatus.

As another embodiment, there is an information processing apparatus 700 that controls the operation of the inspection apparatus 600. FIG. 18 shows an example of the hardware configuration of the information processing apparatus 700 such as an inspection apparatus. Referring to FIG. 18, the information processing apparatus 700 includes, for example, the following hardware components:
  a CPU (central processing unit) 701 (arithmetic logic unit);
  a ROM (read-only memory) 702 (storage unit);
  a RAM (random-access memory) 703 (storage unit);
  programs 704 loaded into the RAM 703;
  a storage unit 705 storing the programs 704;
  a drive unit 706 that writes and reads to and from a storage medium 710 outside the information processing apparatus;
  a communication interface 707 that connects with a communication network 711 outside the information processing apparatus;
  an input/output interface 708 through which data is outputted and inputted; and
  a bus 709 through which the components are connected to each other.

Figure 19:
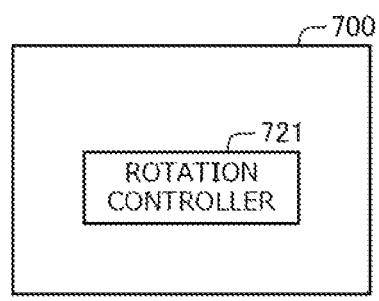
FIG. 19 is a block diagram showing an example of the configuration of the information processing apparatus.

When the CPU 7101 acquires and executes the programs 704, the information processing apparatus 700 functions as a rotation controller 721 shown in FIG. 19. For example, the programs 704 are previously stored in the storage unit 705 or ROM 102, and the CPU 701 loads and executes them into the RAM 703 or the like when necessary. The programs 704 may be provided to the CPU 701 through the communication network 711. Also, the programs 104 may be previously stored in the storage medium 710, and the drive unit 706 may read them therefrom and provide them to the CPU 701.

FIG. 18 shows an example of the hardware configuration of the information processing apparatus 700. However, the hardware configuration of the information processing apparatus 700 is not limited to that described above. For example, the information processing apparatus 700 does not have to include one or some of the above components such as the drive unit 706.

The rotation controller 721 controls the operation of the inclination unit 620, change unit 630, and the like of the inspection apparatus 600 described above. For example, the rotation controller 721 performs control so that the change unit 630 makes a change, then the inclination unit 620 makes an inclination, and then the change unit 630 makes a change again (for example, the change unit 630 restores the container to the state before the change). As with the above configurations, this configuration is also able to accurately detect foreign matters present in the container.

The above-mentioned information processing apparatus 700 can be realized by incorporating a predetermined program into the information processing apparatus 700. Specifically, a program according to another embodiment of the present invention is a program for causing the information processing apparatus 700 to perform a process of changing the area of the container imaged by the imaging apparatus by changing the relative orientations of the container and imaging apparatus around the second axis different from the first axis, then at least inclining the container around the first axis, and then again changing the relative orientations of the container and imaging apparatus around the second axis.

An inspection method performed by the information processing apparatus 700 includes the information processing apparatus 700 changing the area of the container imaged by the imaging apparatus by changing the relative orientations of the container and imaging apparatus around the second axis different from the first axis, then at least inclining the container around the first axis, and then again changing the relative orientations of the container and imaging apparatus around the second axis.

The program (or storage medium) and inspection method having the above configurations according to the present invention also have similar advantageous effects and therefore are able to accomplish the object of the present invention.

As another embodiment, there is an information processing apparatus 800 such as a determination apparatus. The hardware configuration of the information processing apparatus 800 is similar to that described with reference to FIG. 18 and therefore description thereof is omitted.

The information processing apparatus 800 performs a predetermined process on image data acquired by an imaging apparatus for acquiring image data of the container grasped by the inspection apparatus 600 or the like. For example, referring to FIG. 20, the information processing apparatus 800 includes a background model generation unit 821 and a detection unit 822.

The background model generation unit 821 generates a first background model on the basis of acquired image data and generates a second background model on the basis of image data acquired by changing the imaged area of the container. The detection unit 822 detects precipitates in the container on the basis of the first background model and detects precipitates in the container on the basis of the second background model.

The information processing apparatus 800 having such a configuration, an inspection method performed by the information processing apparatus 800, a program for causing the information processing apparatus 800 to perform the inspection method, and the like are also able to accomplish the object of the present invention, as with the above configurations.

<Supplementary Notes>

Some or all of the above embodiments can be described as in Supplementary Notes below. An inspection apparatus and the like according to the present invention will be outlined below. However, the present invention is not limited to the following configurations.

(Supplementary Note 1)

An inspection apparatus comprising:
a grasping unit configured to grasp a container in which a liquid is charged;
an inclination unit configured to at least incline the container around a first axis with the grasping unit grasping the container; and
a change unit configured to change an area of the container imaged by an imaging apparatus by changing relative orientations of the container and the imaging apparatus around a second axis different from the first axis.

(Supplementary Note 2)

The inspection apparatus of Supplementary Note 1, wherein the change unit changes the relative orientations of the container and the imaging apparatus around the second axis by rotating the container around the second axis.

(Supplementary Note 3)

The inspection apparatus of Supplementary Note 2, wherein a rotation speed at which the change unit rotates the container and a rotation speed at which the inclination unit inclines the container are different.

(Supplementary Note 4)

The inspection apparatus of Supplementary Note 2 or 3, wherein a rotation speed at which the change unit rotates the container is lower than a rotation speed at which the inclination unit inclines the container.

(Supplementary Note 5)

The inspection apparatus of any one of Supplementary Notes 2 to 4, wherein the change unit rotates the container at a predetermined speed so that foreign matters in the container are prevented from rising due to rotation of the container.

(Supplementary Note 6)

The inspection apparatus of any one of Supplementary Notes 1 to 5, wherein the first axis is an axis corresponding to a line-of-sight direction of the imaging apparatus.

(Supplementary Note 7)

The inspection apparatus of any one of Supplementary Notes 1 to 6, wherein at least the container is inclined with respect to a predetermined reference plane.

(Supplementary Note 8)

The inspection apparatus of any one of Supplementary Notes 1 to 7, wherein the change unit makes a change, then the inclination unit makes an inclination, and then the change unit makes a change again.

(Supplementary Note 9)

An inspection method comprising an information processing apparatus changing an area of a container imaged by an imaging apparatus by changing relative orientations of the container and the imaging apparatus around a second axis different from a first axis, then at least inclining the container around the first axis, and then again changing the relative orientations of the container and the imaging apparatus around the second axis.

(Supplementary Note 10)

A computer-readable storage medium storing a program for causing an information processing apparatus to perform a process of changing an area of a container imaged by an imaging apparatus by changing relative orientations of the container and the imaging apparatus around a second axis different from a first axis, then at least inclining the container around the first axis, and then again changing the relative orientations of the container and the imaging apparatus around the second axis.

(Supplementary Note 11)

An inspection system comprising:
an inspection apparatus;
an imaging apparatus disposed outside the inspection apparatus and configured to image a liquid charged in a container; and
a determination apparatus configured to detect objects on the basis of image data captured by the imaging apparatus and to determine whether the detected objects are foreign matters, wherein
the inspection apparatus comprises:
a grasping unit configured to grasp the container in which the liquid is charged;
an inclination unit configured to at least incline the container around a first axis with the grasping unit grasping the container; and
a change unit configured to change an area of the container imaged by the imaging apparatus by changing relative orientations of the container and the imaging apparatus around a second axis different from the first axis.

(Supplementary Note 12)

An information processing apparatus comprising:
a background model generation unit configured to generate a first background model on the basis of acquired image data and to generate a second background model on the basis of image data acquired after an imaged area of a container is changed by changing relative orientations of the container and an imaging apparatus; and
an inspection unit configured to detect precipitates in the container on the basis of the first background model and to detect precipitates in the container on the basis of the second background model.

(Supplementary Note 13)

The information processing apparatus of Supplementary Note 12, wherein the detection unit detects precipitates on the basis of the second background model and image data acquired after the container is inclined.

(Supplementary Note 14)

The information processing apparatus of Supplementary Note 12 or 13, wherein the detection unit detects precipitates on the basis of the first background model and image data acquired after the container is inclined and then the imaged area of the container is restored to the imaged area that has yet to be changed.

(Supplementary Note 15)

An inspection method comprising:
generating, by an information processing apparatus, a first background model on the basis of acquired image data and generating a second background model on the basis of image data acquired after an imaged area of a container is changed by changing relative orientations of the container and an imaging apparatus; and
detecting, by the information processing apparatus, precipitates in the container on the basis of the first background model and detecting precipitates in the container on the basis of the second background model.

(Supplementary Note 16)

A computer-readable storage medium storing a program for causing an information processing apparatus to:
generate a first background model on the basis of acquired image data and generate a second background model on the basis of image data acquired after an imaged area of a container is changed by changing relative orientations of the container and an imaging apparatus; and
detect precipitates in the container on the basis of the first background model and detect precipitates in the container on the basis of the second background model.

The programs described in the embodiments and Supplementary Notes are stored in a storage device or a computer-readable storage medium. The storage medium is, for example, a transportable medium, such as a flexible disk, optical disk, magneto-optical disk, or semiconductor memory.

While the present invention has been described with reference to the embodiments, the present invention is not limited thereto. Various changes appreciable by those skilled in the art can be made to the configurations or details of the present invention within the scope of the present invention.

REFERENCE SIGNS LIST 100 inspection system
200 inspection apparatus
210 body
211 flat portion
212 arms
213 upper grasping portion
214 lower grasping portion
220 surface lighting
230 marker
240 motor
250 motor
260 rotation controller
300 camera
400 detection/determination apparatus
410 screen display unit
420 communication I/F unit
430 storage unit
431 image information
432 background information
433 tracking information
434 determination result information
435 program
440 arithmetic processing unit
441 start/end instruction unit
442 image acquisition unit
443 background model generation unit
444 precipitate detection unit
445 detection unit
446 tracking unit
447 angle information acquisition unit
448 determination unit
449 output unit
500 container
600 inspection apparatus
610 grasping unit
620 inclination unit
630 change unit
700 information processing apparatus 701 CPU
702 ROM
703 RAM
704 programs
705 storage unit
706 drive unit
707 communication interface
708 input/output interface
709 bus
710 storage medium
711 communication network
721 rotation controller
821 background model generation unit
822 detection unit

What is claimed is:

1. An inspection apparatus comprising:
a grasper comprising arms configured to grasp a container in which a liquid is charged;
a first motor that functions as an inclination unit configured to at least incline the container around a first axis with the grasper grasping the container; and
a second motor that functions as a change unit configured to change an area of the container imaged by an imaging apparatus by changing relative orientations of the container and the imaging apparatus around a second axis different from the first axis, wherein:
the second motor that functions as the change unit is configured to change the relative orientations of the container and the imaging apparatus around the second axis by rotating the container around the second axis,
a rotation speed at which the second motor that functions as the change unit rotates the container is different from a rotation speed at which the first motor that functions as the inclination unit inclines the container, and
the second motor that functions as the change unit is configured to rotate the container at a predetermined speed so that foreign matters in the container are prevented from rising due to rotation of the container.

2. The inspection apparatus of claim 1, wherein a rotation speed at which the change unit rotates the container is lower than a rotation speed at which the inclination unit inclines the container.

3. The inspection apparatus of claim 1, wherein the first axis is an axis corresponding to a line-of-sight direction of the imaging apparatus.

4. The inspection apparatus of claim 1, wherein at least the container is inclined with respect to a predetermined reference plane.

5. The inspection apparatus of claim 1, wherein the change unit makes a change, then the inclination unit makes an inclination, and then the change unit makes a change again.

6. An inspection method comprising:
grasping, by a grasper comprising arms, a container in which a liquid is charged;
inclining, using a first motor, the container around a first axis with the grasper grasping the container; and
changing, using a second motor, an area of the container imaged by an imaging apparatus by changing relative orientations of the container and the imaging apparatus around a second axis different from a first axis, wherein:
the second motor changes the relative orientations of the container and the imaging apparatus around the second axis by rotating the container around the second axis,
a rotation speed at which the second motor rotates the container is different from a rotation speed at which the first motor inclines the container, and
the second motor rotates the container at a predetermined speed so that foreign matters in the container are prevented from rising due to rotation of the container.

* * * * *